United States Patent
Iniewski et al.

(10) Patent No.: US 11,372,120 B2
(45) Date of Patent: Jun. 28, 2022

(54) CHARGE SHARING CORRECTION METHODS FOR SUB-PIXELLATED RADIATION DETECTOR ARRAYS

(71) Applicant: REDLEN TECHNOLOGIES, INC., Saanichton (CA)

(72) Inventors: Krzysztof Iniewski, Coquitlam (CA); Saeid Taherion, Victoria (CA); Conny Hansson, Victoria (CA); Robert Crestani, Vancouver (CA); Glenn Bindley, Vancouver (CA)

(73) Assignee: REDLEN TECHNOLOGIES, INC., Saanichton (CA)

( * ) Notice: Subject to any disclaimer, the term of this patent is extended or adjusted under 35 U.S.C. 154(b) by 0 days.

(21) Appl. No.: 16/998,676

(22) Filed: Aug. 20, 2020

(65) Prior Publication Data

US 2021/0063589 A1 Mar. 4, 2021

Related U.S. Application Data

(60) Provisional application No. 62/891,833, filed on Aug. 26, 2019.

(51) Int. Cl.
*G01T 7/00* (2006.01)
*G01T 1/24* (2006.01)

(52) U.S. Cl.
CPC ............. *G01T 7/005* (2013.01); *G01T 1/247* (2013.01)

(58) Field of Classification Search
CPC .................... G01T 7/005; G01T 1/247
See application file for complete search history.

(56) References Cited

U.S. PATENT DOCUMENTS

| 7,208,739 | B1* | 4/2007 | Yanoff ................. G01T 1/171 |
| | | | 250/363.09 |
| 8,476,594 | B2 | 7/2013 | Frach et al. |
| 8,564,084 | B2 | 10/2013 | Vogtmeier et al. |
| 9,482,764 | B1* | 11/2016 | Shahar ................. G01T 1/24 |
| 10,393,891 | B2 | 8/2019 | Iniewski et al. |

(Continued)

OTHER PUBLICATIONS

Butler, J.F. et al., "CdZnTe solid-state gamma camera," IEEE Trans. Nucl. Sci., vol. 45, pp. 359-363, Jun. 1998.

(Continued)

*Primary Examiner* — Blake C Riddick
(74) *Attorney, Agent, or Firm* — The Marbury Law Group PLLC

(57) ABSTRACT

Various aspects include methods of compensating for issues caused by charge sharing between pixels in pixel radiation detectors. Various aspects may include measuring radiation energy spectra with circuitry capable of registering detection events occurring simultaneous or coincident in two or more pixels, adjusting energy measurements of simultaneous-multi-pixel detection events by a charge sharing correction factor, and determining a corrected energy spectrum by adding the adjusted energy measurements of simultaneous-multi-pixel detection events to energy spectra of detection events occurring in single pixels. Adjusting energy measurements of simultaneous-multi-pixel detection events may include multiplying measured energies of simultaneous-multi-pixel detection events by a factor of one plus the charge sharing correction factor.

15 Claims, 21 Drawing Sheets

(56) References Cited

U.S. PATENT DOCUMENTS

| | | | |
|---|---|---|---|
| 10,396,109 | B2 | 8/2019 | Iniewski et al. |
| 2002/0037068 | A1 | 3/2002 | Oikawa |
| 2005/0167606 | A1 | 8/2005 | Harrison et al. |
| 2006/0118730 | A1 | 6/2006 | Heftz et al. |
| 2007/0007457 | A1 | 1/2007 | Blevis |
| 2007/0120062 | A1 | 5/2007 | Li et al. |
| 2007/0121781 | A1 | 5/2007 | Meirav et al. |
| 2008/0165921 | A1 | 7/2008 | Tkaczyk et al. |
| 2010/0009821 | A1 | 4/2010 | Hackenschmied et al. |
| 2011/0155918 | A1 | 6/2011 | Bouhnik et al. |
| 2011/0211668 | A1 | 9/2011 | Steadman Booker et al. |
| 2011/0260072 | A1 | 10/2011 | Guerin et al. |
| 2012/0069954 | A1 | 3/2012 | Iso et al. |
| 2014/0341333 | A1 | 11/2014 | Wang et al. |
| 2015/0131776 | A1 | 5/2015 | Cho |
| 2015/0185333 | A1 | 7/2015 | Cho |
| 2015/0234059 | A1 | 8/2015 | Roessl et al. |
| 2015/0243022 | A1 | 8/2015 | Petschke et al. |
| 2016/0093665 | A1 | 3/2016 | Schubert et al. |
| 2016/0240584 | A1 | 8/2016 | El-Hanany et al. |
| 2016/0282505 | A1 | 9/2016 | Lee et al. |
| 2016/0296184 | A1 | 10/2016 | Rodrigues et al. |
| 2017/0016998 | A1 | 1/2017 | Shahar et al. |
| 2017/0269240 | A1* | 9/2017 | Shahar .................... G01T 7/005 |
| 2017/0290555 | A1 | 10/2017 | Iniewski et al. |
| 2017/0322319 | A1* | 11/2017 | Iniewski ................. G01T 1/171 |
| 2020/0150297 | A1 | 5/2020 | Iniewski et al. |
| 2020/0209415 | A1* | 7/2020 | Veale ...................... G01T 1/247 |

OTHER PUBLICATIONS

Eisen, Y. et al., "NUCAM3—A Gamma Camera Based on Segmented Monolithic CdZnTe Detectors", IEEE Trans. Nuclear Sci., vol. 49, Aug. 2002, pp. 1728-1732.

Hruska, C.B. et al., "CZT Detectors : How important is Energy Resolution for Nuclear Breast Imaging", Physica Medica, 2006, 21 Suppl. 1 72-5.

Iniewski, K. et al., "CZT Pixel Scaling for Improved Spatial Resolution in Medical Imaging," All content following this page was uploaded by K. Iniewski on Jun. 6, 2014, https://www.researchgate.net/publication/236011696_CZT_Pixel_Scaling_for_Improved_Spatial_Resolution_in_Medical_Imaging.

Maehlum, G. et al., "Study of Cadmium Zinc Telluride (CZT) Radiation Detector Modules under Moderate and Long-term Variations of Temperature and Humidity", IEEE NSS-MIC, Honolulu, 2007.

Mestais, C. et al., "A new design for high resolution, high efficiency CZT gamma camera detector," Nucl. Instrum. Methods, vol. A458, pp. 62-67, 2001.

Peng, H. et al., Design study of a high-resolution breast-dedicated PET system built from cadmium zinc telluride detectors, IEEE NSS-MIC, Honolulu, 2007.

Wear, J. et al., "CZT detector for dual energy x-ray absorptiometry (DEXA)", 1999 SPIE Annual Meeting.

U.S. Appl. No. 16/931,800, filed Jul. 17, 2020, Redlen Technologies, Inc.

Chmeissani, M. et al., "*First Experimental Tests with a CdTe Photon Counting Pixel Detector Hybridized with a Medipix2 Readout Chip*," IEEE Transactions on Nuclear Science, vol. 51, No. 5, pp. 2379-2385, (2004).

Hamel, L.A. et al., "Optimization of Single-Sided Charge-Sharing Strip Detectors," Hamel IEEE, pp. 1-3, (2006).

Hu, H. et al., "*Four Multidetector-Row Helical CT: Image Quality and Volume Coverage Speed*," Radiology, vol. 215, No. 1, pp. 55-62, (2000).

Iniewski, K. et al., "*CZT Growth, Characterization, Fabrication, and Electronics for Operation at >100 Mcps/mm²*," Workshop on Medical Applications of Spectroscopic X-Ray Detectors, CERN, 1 page, (2015).

Kalemci, E. et al., "Investigation of charge sharing among electrode strips for a CdZnTe detector," Center for Astrophysics and Space Sciences, University of California, San Diego, California, pp. 1-16, (2013).

Kalender, W.A., "*Trends in X-Ray CT Imaging and Respective Demands on Detectors*," Institute of Medical Physics, iworid 2008, Helsinki, 33 pages, (2008).

Koenig, T. et al., "The New Medipix3 RX with CdTe Sensors: How Charge Summing Copes with Characteristic X-Rays and High Photon Fluxes," Karlsruhe Institute of Technology, pp. 1-19, (2013).

Murphy, D. T. et al., "Technical Advancements in Dual Energy," Department of Radiology, St. Paul's Hospital, Springer International Publishing Switzerland, pp. 151-172, (2015).

Murphy, D.T. et al., "*Technical Advancements in Dual Energy*," Published in P. M. Carrascosa et al. (eds.), Dual-Energy CT in Cardiovascular Imaging, Springer International Publishing, Switzerland, pp. 151-152, (2015).

Oonuki, K. et al., "Development of Uniform CdTe Pixel Detectors Based on Caltech ASIC," Institute of Space and Astronautical Science (ISAS/JAXA), Sagamihara, Kanagawa 229-8510, Japan; Department of Physics, University of Tokyo, Bunkyo, Tokyo 113-0033, Japan; and Department of Physics, California Institute of Technology, Pasadena, CA 91125, USA, 11 pages, (2004).

Shikhaliev, PM. et al., "*Tilted Angle CZT Detector for Photon Counting/Energy Weighting X-ray and CT Imaging*," Phys Med Biol., vol. 51, No. 17, pp. 4267-4287, (2006).

Spieler, H., "Analog and Digital Electronics for Detectors," Physics Division, Lawrence Berkeley National Laboratory, Berkeley, California, p. 1-43, (2003).

Taguchi, K. et al., "*An Analytical Model of the Effects of Pulse Pileup on the Energy Spectrum Recorded by Energy Resolved Photon Counting X-ray Detectors*," Medical Physics, vol. 37, No. 8, pp. 3957-3969, (2010).

* cited by examiner

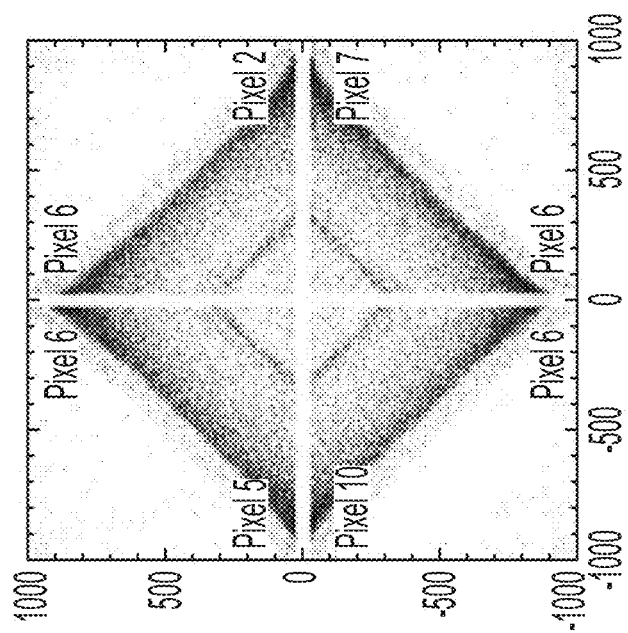
FIG. 13C
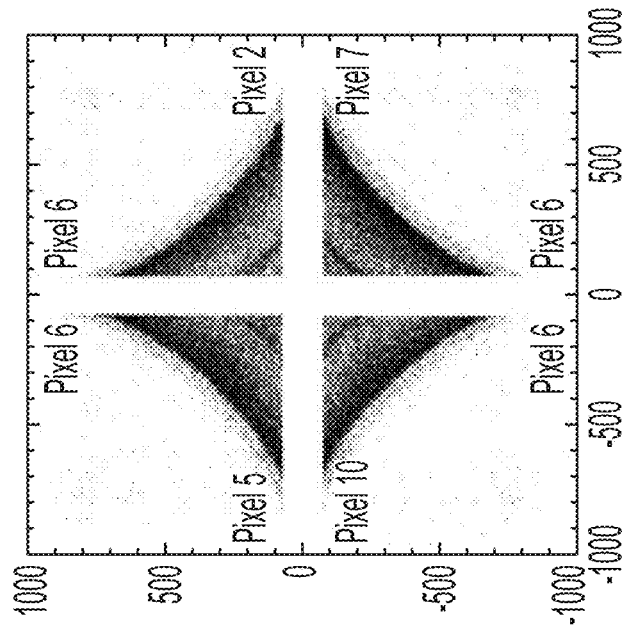
FIG. 13B
FIG. 13A

CHARGE SHARING CORRECTION METHODS FOR SUB-PIXELLATED RADIATION DETECTOR ARRAYS

FIELD

The present application relates generally to radiation detectors for computed tomography imaging systems, and more specifically to methods for processing the output of pixelated radiation detectors.

BACKGROUND

In Single Photon Emission Computed Tomography (SPECT) imaging systems, gamma rays emitted from a source, such as a radiopharmaceutical or radiotracer, are detected by a detector array, such as a cadmium zinc telluride ("CZT") detector. Other direct conversion detectors employing cadmium telluride (CdTe), gallium arsenide (GaAs), or silicon (Si), or any indirect director based on a scintillator material, may also be used in SPECT imaging systems. Images taken at different angles are joined together to reconstruct 3-dimensional images of the object under examination.

The electrical signal generated by solid state radiation detectors, such as CZT detectors, results from gamma-rays exciting electrons in the atoms of the material that ejects electrons from their orbits and into a conduction band of the bulk material. Each electron ejected into the conduction band leaves behind a net positive charge that behaves like a positively charged particle known as a "hole" that migrates through the material in response to an electric field applied between a cathode and an anode. Electrons in the conduction band are attracted by the resulting internal electric field and migrate to the anode where they are collected creating a small current that is detected by circuitry, while the holes migrate towards the cathode.

Each gamma-ray will generate many electron-hole pairs, depending upon the energy of the photon. For example, the ionization energy of CZT is 4.64 eV, so absorbing the energy of a 140 keV gamma ray from Technetium will generate about 30,000 electron-hole pairs.

One of the critical parameters of the CZT pixels is a direct current (DC) "dark current" they produce due to the high voltage bias applied across the sensor. The DC dark current flows into the electronic channel used to read CZT charge signals generated from photon interactions with the CZT material. Compensation of the dark current in a CZT sensor is not a trivial task. The DC dark current is not pure DC as there is some drift due to temperature or other reasons that cause the current to change with time. Consequently, the electronics input channel needs to compensate for this slowly changing current while properly detecting fast changing CZT charge signals from photon detection events. Typically, solving that design trade-off between these two competing considerations results in a limit of how much dark current can be compensated. Typical maximum dark current that can compensated is in the range of 0.5 to 5 nA depending on the detector design.

SUMMARY

Various aspects of the present disclosure involve reducing the size of detector elements by subdividing pixels into a number of sub-pixel elements and compensating for the increase in charge sharing between detector elements resulting from the decrease in area of each detector element.

Various aspects include methods for correcting spectra measured by an imaging radiation detector comprised of an array of pixels each of which is comprised of an array of sub-pixel detectors to account for charge sharing effects. Such methods may include measuring radiation energy spectra by the imaging radiation detector using processing circuitry capable of registering simultaneous, coincident detection events occurring in two or more sub-pixel detectors within any pixel, summing energy measurements of detection events occurring simultaneously in two or more sub-pixel detectors within a pixel ("sub-pixel simultaneous detection events") to obtain a first energy measurement of multi-subpixel detection events, adjusting the first energy measurements of sub-pixel simultaneous detection events by a sub-pixel charge sharing correction factor, and determining a corrected gamma photon energy spectrum by adding the adjusted energy measurements of sub-pixel simultaneous detection events to gamma photon energy measurements of detection events occurring in single sub-pixel detectors ("single-sub-pixel detection events").

Some aspects may further include determining the sub-pixel charge sharing correction factor by exposing the imaging radiation detector to radiation from a source of gamma photons of a known energy or energy spectrum, estimating gamma photon energies for sub-pixel simultaneous detection events by summing energy measurements by the two or more sub-pixel pixel detectors, and determining the sub-pixel charge sharing correction factor based upon the known energy or energy spectrum of gamma photons from the source and the estimated gamma photon energies from sub-pixel simultaneous detection events to account for inter-sub-pixel charge loss effects. In some aspects, adjusting the energy measurements of sub-pixel simultaneous detection events by a sub-pixel charge sharing correction factor may include multiplying measured energies of sub-pixel simultaneous detection events by a factor of one plus the sub-pixel charge sharing correction factor.

Some aspects may further include determining the sub-pixel charge sharing correction factor by exposing the imaging radiation detector to radiation from a source of gamma photons of a known energy or energy spectrum, determining a first energy spectra for detection events occurring in single sub-pixel detectors and determining its peak value VSPpeak1, determining a second energy spectra for sub-pixel simultaneous detection events and determining its peak value VSPpeak2, and calculating the sub-pixel charge sharing correction factor as (VSPpeak1−VSPpeak2)/VSPpeak2. In some aspects, adjusting the energy measurements of sub-pixel simultaneous detection events by a charge sharing correction factor may include multiplying measured energies of sub-pixel simultaneous detection events by a factor of one plus the sub-pixel charge sharing correction factor.

In some aspects, determining the sub-pixel charge sharing correction factor may be performed for each pixel detector individually to determine a sub-pixel charge sharing correction factor for each pixel. In such aspects, determining the corrected gamma photon energy spectrum may be performed for each pixel by summing energy measurements of sub-pixel simultaneous detection events within each pixel detector to obtain a first energy measurement of multi-subpixel detection events in each pixel, adjusting the first energy measurements of sub-pixel simultaneous detection events in each pixel detector by the sub-pixel charge sharing correction factor determined for each pixel detector, and determining a corrected gamma photon energy spectrum for each pixel detector by adding the adjusted energy measurements of sub-pixel simultaneous detection events to energy measurements of single-sub-pixel detection events in each pixel detector.

Some aspects include methods of calibrating a pixel radiation detector comprising an array of pixels each comprising an array of sub-pixel detectors to account for inter-sub-pixel charge sharing effects. Such aspects may include exposing the imaging radiation detector to radiation from a source of gamma photons of a known energy or energy spectrum, measuring gamma photon energies detected by the pixel radiation detector using electronics capable of registering simultaneous, coincident detection events occurring in two or more sub-pixel detectors within a pixel, determining energies of gamma photons detected in sub-pixel detectors within a pixel for sub-pixel simultaneous detection events, and determining a sub-pixel charge sharing correction factor based upon the radiation source known gamma photon energy and determined energies of gamma photons detected in sub-pixel detectors within a pixel in sub-pixel simultaneous detection events. In such aspects, determining a sub-pixel charge sharing correction factor based upon the radiation source known gamma photon energy and determined energies of gamma photons detected in adjoining pixels in sub-pixel simultaneous detection events accounts for inter-sub-pixel gap charge loss as a function of a difference between energies measured in sub-pixel detectors. In such aspects, determining a sub-pixel charge sharing correction factor based upon the radiation source known gamma photon energy and determined energies of gamma photons detected in adjoining pixels in sub-pixel simultaneous detection events may include determining a first energy spectra for detection events occurring in single pixels and determining its peak value VSPpeak1, determining a second energy spectra for sub-pixel simultaneous detection events occurring and determining its peak value VSPpeak2, and calculating the charge sharing correction factor as (VSPpeak1−VSPpeak2)/VSPpeak2.

In some aspects, determining a sub-pixel charge sharing correction factor based upon the radiation source known gamma photon energy and determined energies of gamma photons detected in sub-pixel detectors in sub-pixel simultaneous detection events may be performed for each pixel detector individually to determine a sub-pixel charge sharing correction factor for each pixel. In such aspects, the method may be performed as part of manufacturing the pixel radiation detector, and may include storing the sub-pixel charge sharing correction factors in memory associated with the pixel radiation detector.

Some aspects include an imaging radiation detector including an array of pixels each comprising an array of sub-pixel detectors, and detector processing circuitry coupled to each sub-pixel detector, the detector processing circuitry capable of registering simultaneous, coincident detection events occurring in two or more sub-pixel detectors within any pixel. The detector processing circuitry may be configured to sum energy measurements of sub-pixel simultaneous detection events to obtain a first energy measurement of multi-subpixel detection events, adjust the first energy measurements of sub-pixel simultaneous detection events by a sub-pixel charge sharing correction factor, and determine a corrected gamma photon energy spectrum by adding the adjusted energy measurements of sub-pixel simultaneous detection events to gamma photon energy measurements of detection events occurring in single sub-pixel detectors.

Some aspects include an imaging radiation detector including an array of pixels each comprising an array of sub-pixel detectors, means for summing energy measurements of sub-pixel simultaneous detection events to obtain a first energy measurement of multi-subpixel detection events, means for adjusting the first energy measurements of sub-pixel simultaneous detection events by a sub-pixel charge sharing correction factor, and means for determining a corrected gamma photon energy spectrum by adding the adjusted energy measurements of sub-pixel simultaneous detection events to gamma photon energy measurements of detection events occurring in single sub-pixel detectors.

BRIEF DESCRIPTION OF THE DRAWINGS

The accompanying drawings are presented to aid in the description of embodiments of the disclosure and are provided solely for illustration of the embodiments and not limitation thereof.

FIG. 13A is a top view diagram of a semiconductor pixel radiation detector.

FIGS. 13B-13C are plots of energy spectra of detect events occurring simultaneously between center the pixel 6 and adjacent pixels 2, 5, 7, 10 shown in FIG. 13A.

DETAILED DESCRIPTION

Figure 1:
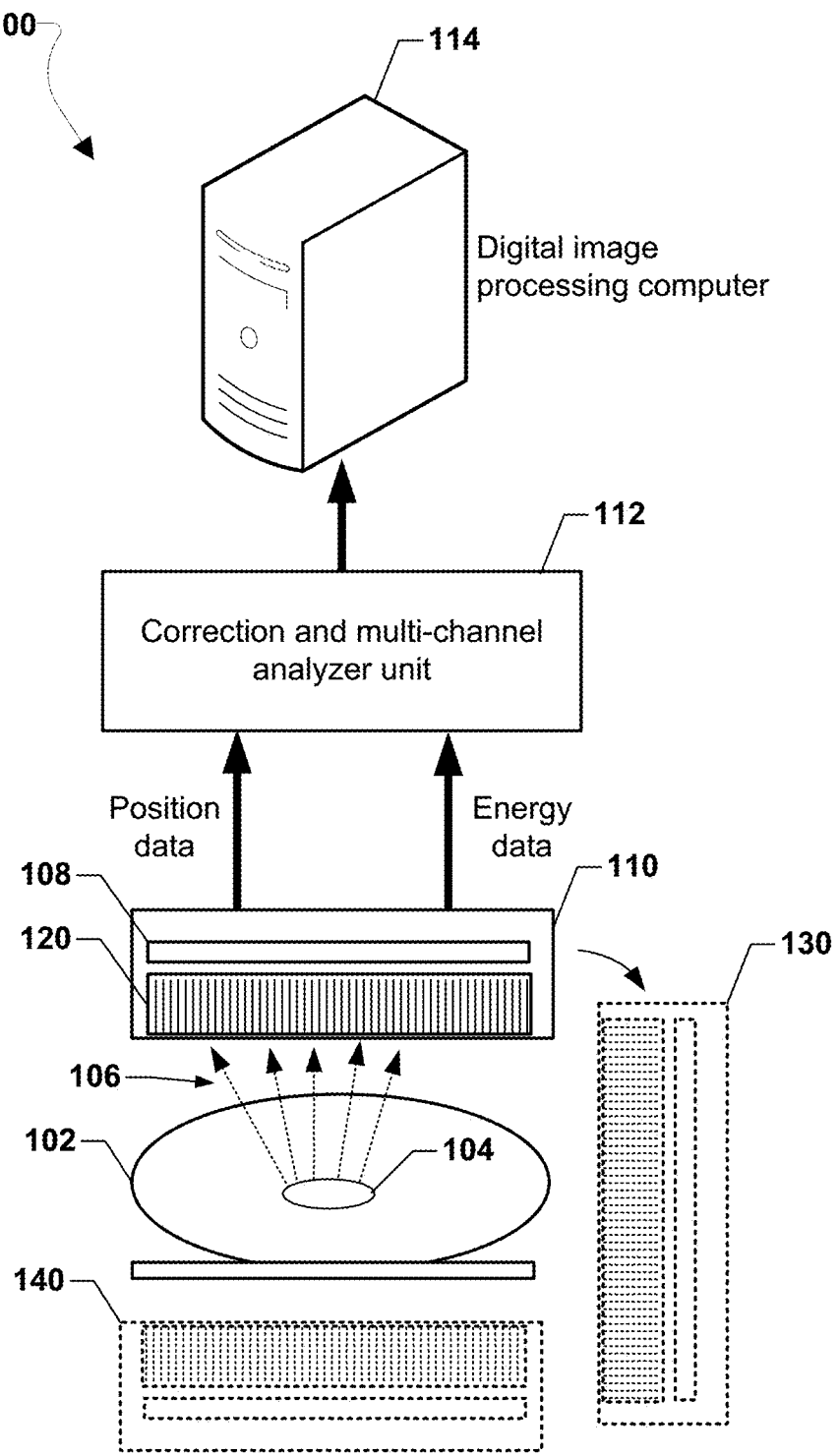
FIG. 1 is a block diagram of a Single Photon Emission Computed Tomography (SPECT) imaging system suitable for use with various embodiments of the present disclosure.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims. Any reference to claim elements in the singular, for example, using the articles "a," "an," or "the" is not to be construed as limiting the element to the singular. The terms "example," "exemplary," or any term of the like are used herein to mean serving as an example, instance, or illustration. Any implementation described herein as an "example" is not necessarily to be construed as preferred or advantageous over another implementation. The drawings are not drawn to scale. Multiple instances of an element may be duplicated where a single instance of the element is illustrated, unless absence of duplication of elements is expressly described or clearly indicated otherwise.

Various embodiments of the present disclosure include pixilated CZT radiation detectors used in gamma imaging systems configured to reduce dark current generated in the detector array to improve accuracy by subdividing pixels into a number of subpixel detector elements and applying methods for compensating for effects due to charge sharing between subpixel detectors.

As noted above, a critical parameter of CZT pixelated detectors is the DC dark current produced under the high voltage bias that is applied across the sensor. Thus, there is strong interest in reducing CZT dark current in such X-ray and gamma ray imaging sensors. However, reducing the dark current is a difficult design challenge. Lowering the high voltage applied across the sensor is not possible as that affects products performance. Using sensor material with higher resistivity is typically not possible as sensors are fabricated with the highest possible resistivity. Lowering operating temperature is not practical as doing so restricts the applications for the detectors and requires additional cooling. Finally, changing the nature of the anode contact, for example by making it more blocking, could lead to increase in sensor polarization, a phenomenon that paralyzes sensor operation at certain flux rates.

Various embodiments address the dilemma posed by dark current in CZT pixelated detectors by reducing the area of each detector element, which reduces dark current is reduced proportionally. This is accomplished by dividing each pixel detector into several smaller elements or "subpixels," typically in a 2×2, 3×3, 4×4, etc. fashion. By subdividing each pixel detector into a number of small subpixels, the area of each of each individual detector element is significantly reduced, thereby reducing the dark current produced in each detector element. The charge gathered by each subpixel within a given pixel may be summed to determine the charge generated in the pixel from the absorption of an X-ray or gamma ray photon. Compensation for charge sharing effects may also be applied.

FIG. 1 is a functional block diagram of a SPECT imaging system 100. In a SPECT imaging system 100, a subject 102 (e.g., a patient) may be injected with a radiopharmaceutical containing a radioisotope, such as technetium 99, that is chemically configured to be absorbed by an organ or tumor to be examined creating a concentrated radiation source 104. The radiopharmaceutical within the source organ 104 emits gamma rays 106 that are detected by a digital radiation detector 108 within a gamma camera 110. Count and energy data from individual pixels within the digital radiation detector 108 are provided to an analyzer unit 112 that analyzes the detector data to determine the count and energy spectrum of detected gamma rays and provides the analyzed data to a digital imaging system computer 114. The analyzer unit 112 may apply calibration corrections including, for example, corrections for charges shared between pixels is determined according to various embodiments.

The SPECT imaging system 100 may also include additional structures, such as a collimator 120 within the gamma camera 110 and a robotic mechanism (not shown) that is configured to position the gamma camera 110 over the subject 102 at a variety of orientations (as illustrated in 130 and 140). Positioning the gamma camera 110 at various orientations with respect to the subject 102 enables gamma ray count and energy data to be acquired by the multi-pixel detector 108 from several different angles. Data collected in this manner can then be processed by the digital image system computer 114 to construct a 3D image of the organ or tumor 104 where the radiopharmaceutical has accumulated.

Various alternatives to the design of the SPECT imaging system 100 of FIG. 1 may be employed to practice embodiments of the present disclosure. For example, in industrial applications, such as luggage screening, the gamma source 104 may be positioned on a far side of the object being scanned with respect to the gamma camera and the gamma photons imaged by the detector 106 may be photons that have passed through the object instead of being emitted from the object. In such applications, the gamma source 104 and gamma camera 110 may be both rotated about the object, such as on a rotating frame or gantry. Further, various other types of systems that include a gamma camera that uses a solid-state pixilated radiation detector may benefit from various embodiments, particularly for calibrating the radiation detector during manufacture or in service.

The detector 106 of a SPECT imaging system may include an array of radiation detector elements, referred to as pixel sensors. The signals from the pixel sensors may be processed by a pixel detector circuit, such as an analyzer unit 112, which may sort detected photons into energy bins based on the energy of each photon or the voltage generated by the received photon. When a gamma photon is detected, its energy is determined and the photon count for its associated energy bin is incremented. For example, if the detected energy of a photon is 64 kilo-electron-volts (keV), the photon count for the energy bin of 60-80 keV may be incremented. The number of energy bins may range from one to several, such as two to six. The greater the total number of energy bins, the better the energy spectrum discrimination. Thus, the detector 106 of a gamma camera 110 provides information regarding both the location (within pixels) of gamma photon detections and the energy of the detected gamma photons.

Figure 2:
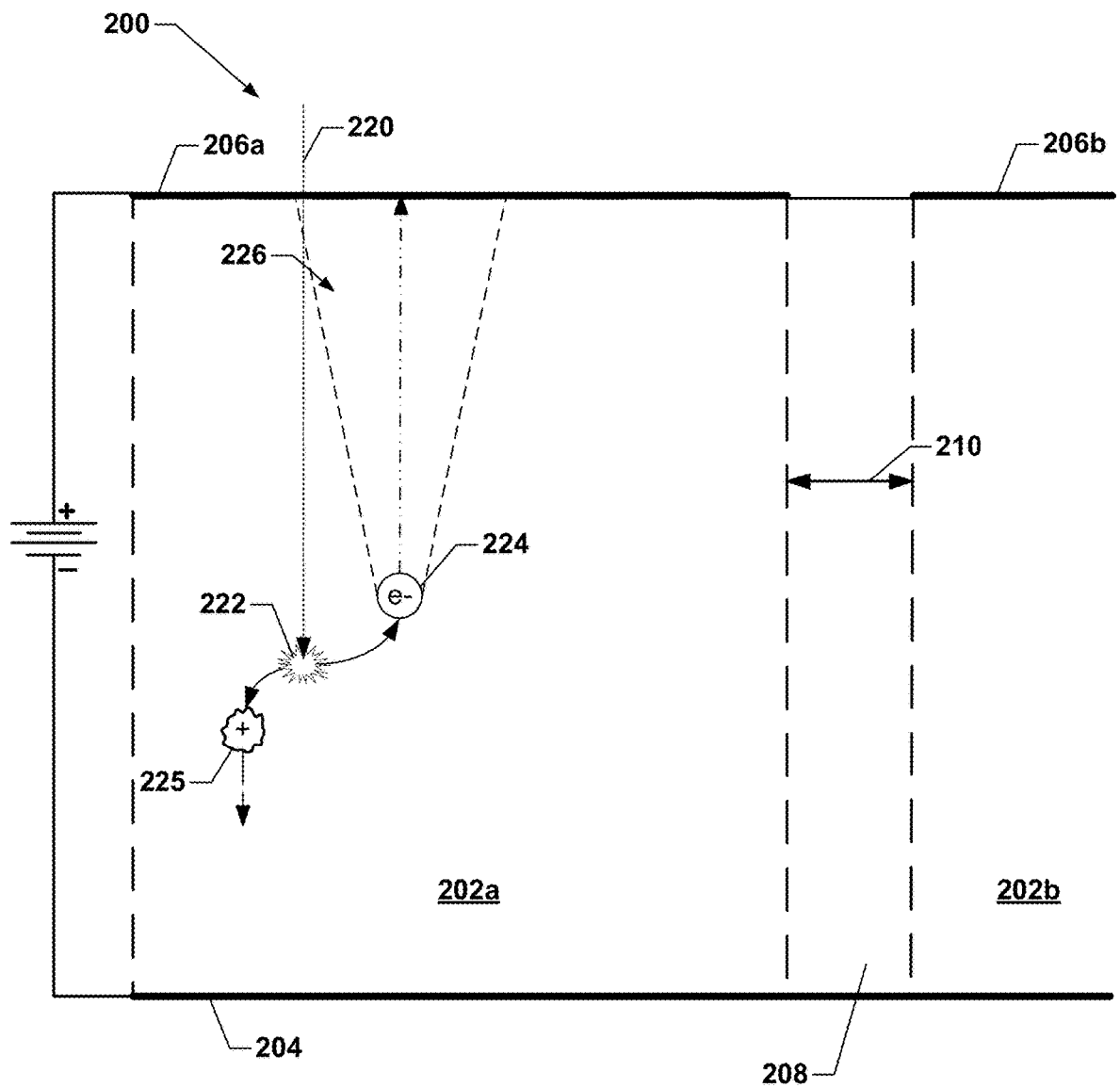
FIG. 2 is a conceptual cross section view diagram of a semiconductor pixel radiation detector illustrating gamma-ray interactions.

FIG. 2 illustrates a cross-sectional view of two pixels 202a, 202b within a CZT radiation detector array 200. Such a detector 200 may include a sheet of CZT semiconductor crystal 208 on which are applied to a cathode 204 and the anodes 206a, 206b that define each pixel 202a, 202b. The anodes 206a, 206b may be spaced apart by an inter-pixel gap 210. In typical radiation detector arrays 200, the thickness of the CZT semiconductor crystal 208 may range from 1 mm to 20 mm, the anodes 206a, 206b may have a side dimension of 0.1 mm to 3 mm, and the inter-pixel gap 210 may range from 0.01 mm to 0.5 mm.

When a gamma-ray 220 is absorbed 222 by an atom within the CZT semiconductor crystal 208, a cloud of electrons 224a are ejected into the conduction band of the semiconductor. Each ejected electron 224 creates a corresponding hole 225 of positive charge. A voltage is applied between the cathode 204 and anodes 206a, 206b causes the electrons 224 to drift to the anode 206a where they are collected as a signal as described above. As described more fully below, diffusion and charge repulsion forces cause the electron cloud to expand (as shown at 226) by the time the electrons reached the anode 206a. Holes 225 similarly migrate towards the cathode 204.

Figure 3:
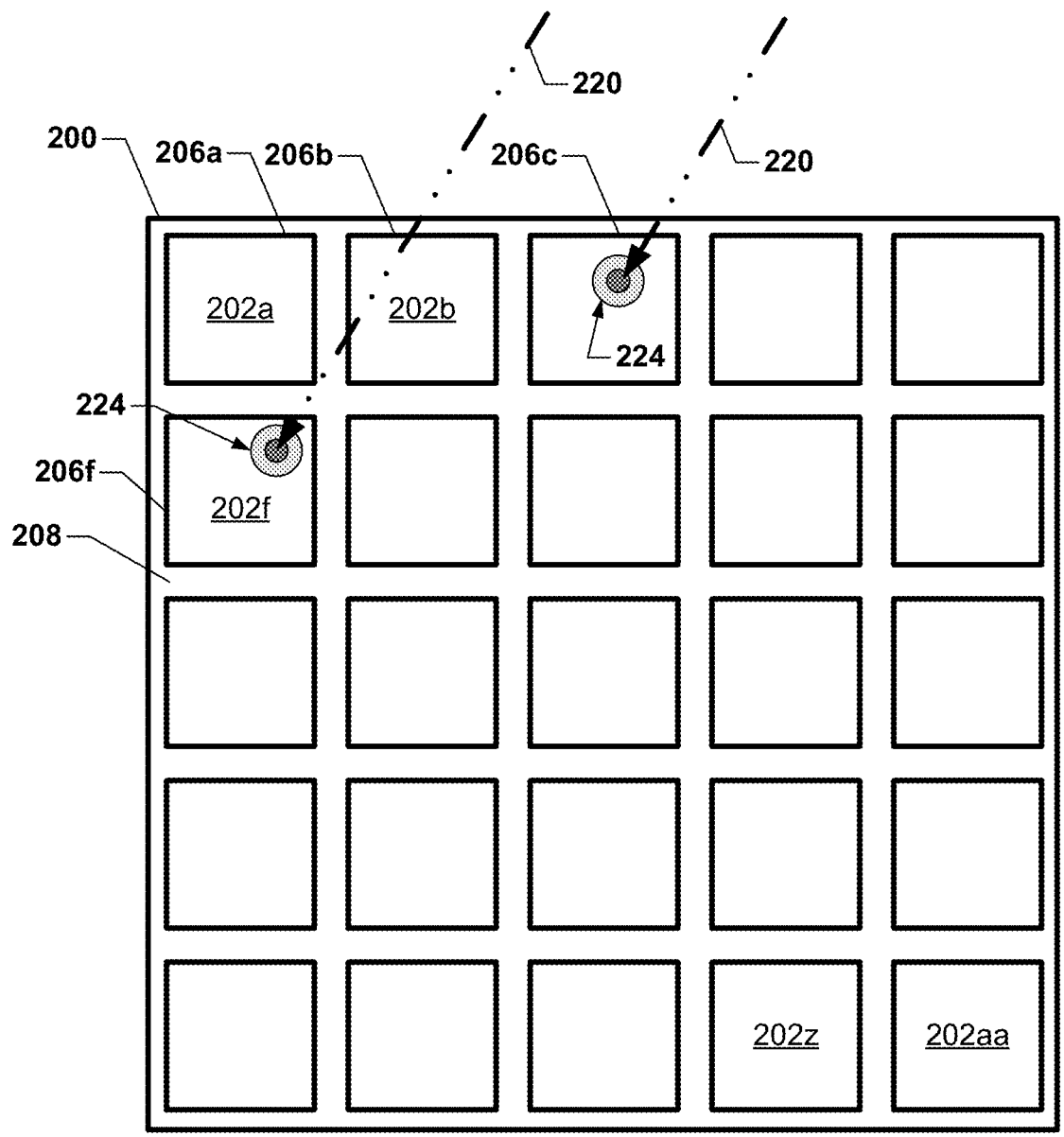
FIG. 3 is a conceptual top view diagram of a semiconductor pixel radiation detector illustrating gamma-ray interactions.

FIG. 3 is a top view of a portion of a pixelated radiation detector array 200 showing the plurality of pixels 202a-202aa formed by the anodes 206a, 206b positioned on the CZT semiconductor crystal 208. As described above, when a gamma-ray 220 interacts with atoms within the CZT semiconductor crystal 208, the ejected electrons 224 are gathered on the nearby anode 206c, 206f and recorded as a count. Further, the number of electrons 224 (i.e., charge) collected on the anode 206c, 206f is reflective of the energy of the incoming photon, and thus a measurement of the energy (or spectrum) of the detected photon can be determined from the charge or current detected on the anodes.

A fundamental problem with accurate energy resolution when using pixelated CZT radiation detectors is charge sharing between pixels. Charge sharing strongly depends on CZT inter-pixel gap properties, in particular on pixel to pixel spacing 210 and the nature of the surface passivation. Unless the surface passivation is ideal (which it never is), or the inter-pixel gap 210 very small (which cannot be accomplished using current manufacturing methods) there will be some charge-lost in the inter-pixel gap. Further, the amount of charge loss for photons interacting within the inter-pixel gap 210 depends upon the passivation process, which can vary from fabrication lot to fabrication lot, from detector to detector within a fabrication lot, and even from pixel gap to pixel gap. Consequently, a correction factor to account for inter-pixel gap charge loss may need to be determined (e.g., by a calibration test) for each detector at the time of manufacture (e.g., prior to shipment to the OEM customer). Such correction factors may also be determined for each inter-pixel gap to account for variations in surface passivation across each detector. Further, the inter-pixel gap charge loss may be temperature dependent, so such calibration testing may be performed over a range of operating temperatures for the detector. When performed during or after fabrication, the correction factor(s) determined during calibration testing may be stored in FLASH memory of the detector module so that the factor(s) can be retrieved and applied by the OEM manufacturer of the gamma camera and/or SPECT imaging system.

In a typical pixilated CZT detector, charge sharing can result in 10-15% count loss for pixels with a 500 um pixel pitch. Adding an inter-pixel steering grid (not shown) to reduce charge-sharing events would increase the input current leakage, and so does not work well in practice. Correcting for charge-sharing in signal processing typically requires either rejecting charge-sharing events or adding charge-sharing events by monitoring signals from the adjacent pixels. Rejection of the charge-shared events leads to loss of the detector efficiency, and so is typically not acceptable as reduced efficiency requires longer scan times and/or higher radiation doses. Adding neighboring charges does not work either due to charge-loss in the interpixel gap.

Charge sharing is typically an undesired phenomenon in imaging applications as the original charge induced in the CZT material is split between two or more pixels. As a result, the measured energy of the incoming photon is possibly registered with a wrong energy information and a wrong pixel location. However, when properly understood and analyzed, charge-sharing can actually lead to an improved spatial resolution and detector efficiency as provided for in various embodiments.

Gamma-ray photons can interact with the CZT material in various ways. The photons may be completely removed from the incident photon beam by absorption, may be scattered after the interaction, or may pass through the CZT detector without any deterioration of their energy. At low energies of interests, such as below 200 keV, and typical sensor thickness of 5 mm, most of the incoming radiation photons are either absorbed or scattered, the relative portion of each effect being highly dependent on the incoming photon energy.

The following three absorption and scattering effects are the most relevant: the photo-electric effect; Rayleigh scattering; and Compton scattering. The effective photon cross section in CZT of each effect is plotted in the graph 400 that is FIG. 4. Photo-electric effect (402) is dominant in the considered energy range of 20 to 200 keV, which is typical for medical imaging. Rayleigh scattering 404 is a dominant form of scattering at lower energies. At higher energies Compton scattering 406 becomes more probable. For example, a gamma-ray photon with an energy of 122 keV will interact with a CZT radiation detector via the photo-electric effect with an 82% probability, via the Rayleigh scattering with a 7% probability, and via the Compton scattering with a 11% probability. Due to the energy dependency of the cross sections for these three types of interactions, charge-sharing correction methods of various embodiments work the best at energies below 200 keV, working less well at higher energies due to Compton scattering.

Figure 5:
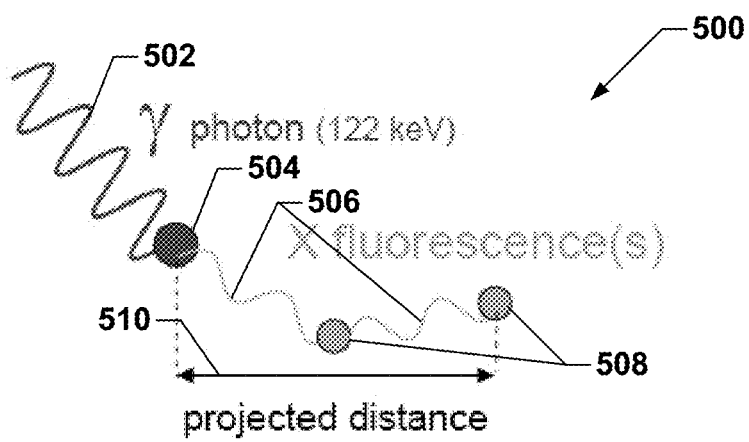
FIG. 5 is a diagram of gamma ray interactions in a CZT detector may occur according to the photoelectric effect.

The diagram 500 in FIG. 5 illustrates the photo-electric effect in which the energy of the interacting photon 502 is absorbed 504 by an electron that is ejected (referred to as a "photo-electron") from its atom and the photon effectively disappears after the interaction. A complete absorption of the photon energy is the desired effect for CZT imaging. The name "photo-electron" comes from a process of ejecting an electron from one of the atomic shells of CZT. After the ejection of the photo-electron the atom is ionized. The vacancy in the bound shell is refilled with an electron from the surrounding medium or from an upper atom shell. This may lead either to the emission of one or more characteristic fluorescence X-rays 506 or to the ejection of an electron from one of the outer shells called an Auger electron.

Depending whether tellurium, cadmium or zinc atoms are involved the resulting fluorescence X-ray 506 energies might be in an 8 to 31 keV range (Te 27-31 keV; Cd 23-26 keV; Zn 8-10 keV). Therefore, in practical terms soft X-rays events may be detected if the detection threshold is at least 31 keV, which is typically the case. This is in particularly true in single-photon emission spectroscopy (SPECT) that uses standard isotopes like Technetium ($^{99m}$Tc) that emits a 140 keV photon. In addition, the projected distance 510 that the fluorescence X-rays 506 may travel in CZT is about 0.1 mm, which is much smaller than the typical pixel size of 2 mm. Therefore, while fluorescence generated soft X-rays 506 might show up in the tail of the measured CZT spectrum, such signals will likely not contribute significantly to charge sharing between pixels. However, it is worth noting that the generation of soft-X rays 506 affects the measured spectrum indirectly because the system will measure the energy of the absorbed photon as being less than the actual γ-photon energy by the amount of energy in the soft X-rays, thereby distorting the measured spectrum of radiation.

Rayleigh scattering involves photon scattering by atoms as a whole, frequently also called coherent scattering as the electrons of the atom contribute to the interaction in a coherent manner so that there is no energy transferred to the CZT material. The elastic scattering process changes only the direction of the incoming photon. Rayleigh scattering is a rather negligible effect in CZT SPECT imaging as it will not affect the measured energy spectrum, although it may lower the camera efficiency a bit.

Figure 6:
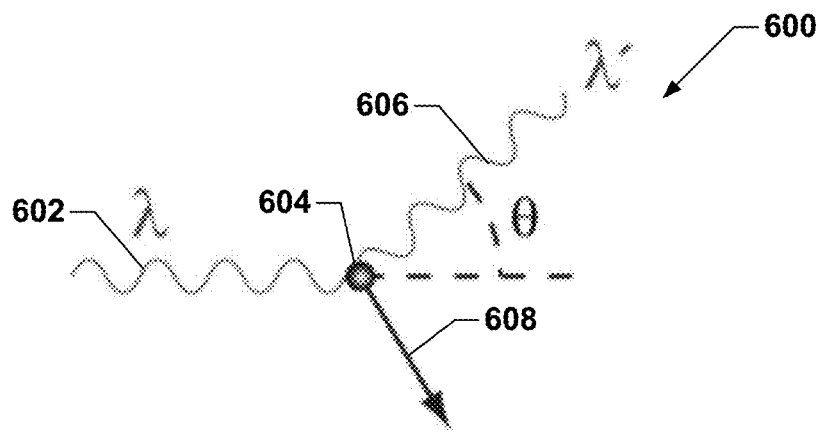
FIG. 6 is a diagram of Compton scattering.

Unlike Rayleigh scattering, Compton scattering involves photons that are scattered by free electrons and as a result lose some of their primary energy. The scattering diagram 600 in FIG. 6 illustrates that Compton scattering 600 occurs when an incoming photon 602 imparts some of its energy to a free electron 604 as kinetic energy, sending the electron along a path 608, with the resulting lower energy photon 606 scattering through an angle θ. This mechanism can contribute significantly to the measured CZT spectrum. The decrease in the photon energy that occurs in a Compton scattering event increases with increasing scattering angle θ. The energy and momentum lost by the photon 606 is transferred to one electron 604, called the recoil electron, which is emitted under a certain angle with respect to the direction of the incoming photon and can have a maximum kinetic energy defining as the so-called Compton edge. The Compton edge it is frequently visible in the spectrum measured by a CZT radiation detector as an abrupt end to the energy tail caused by Compton scattering.

The Compton scattering equation describes the change in photon energy and its corresponding wavelength as:

$$\lambda' - \lambda = \frac{h}{m_e c}(1 - \cos\theta)$$

where λ is the wavelength of the photon before scattering, λ' is the wavelength of the photon after scattering, $m_e$ is the mass of the electron, θ is the angle by which the photon's trajectory changes, h is Planck's constant, and c is speed of light. Substituting textbook values for $m_e$, c and h, the characteristic Compton wavelength, defined as $h/(m_e c)$, is found to be equal to 2.4 picometers (pm).

The Compton equation has two interesting properties. First, the characteristic Compton wavelength value is small compared to typical gamma ray wavelengths used in medical imaging (the wavelength of a 100 keV gamma ray is about 12 pm). As the result, the maximum wavelength change due to Compton scattering is only a fraction of the original wavelength. Secondly, the largest change in the photon energy can only be expected for scattering angles θ close to 180 degrees. Thus, the maximum wavelength change is twice the Compton wavelength change.

Figure 7:
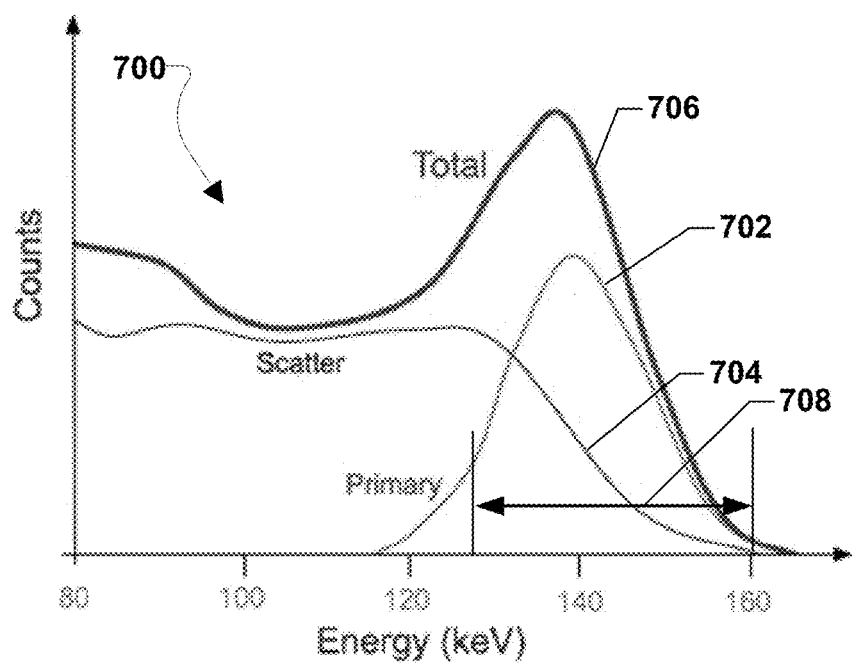
FIG. 7 is a graph of counts vs. energy illustrating contributions of primary gamma rays and scattered gamma rays in a total count of gamma rays measured by a radiation detector.

Compton scattering also occurs within the imaging subject in SPECT as well as in surrounding structures and the camera itself, raising the problem of distinguishing gamma photons that are coming from the subject of the imaging from gamma photons scattered off of other structures. Small angle Compton scattering diverts gamma photons through a small angle that may be acceptable for imaging, but reduces the gamma photon energy by only a small amount. In contrast, large angle Compton scattering, which would interfere with imaging, reduces the gamma photon energy by a significant amount. FIG. 7 illustrates in the graph 700 how the total number of gamma photons counted by the radiation detector (line 706) will be the combination of photons traveling directly from the radiation source to the detector (line 702 referred to as "primary" counts) and photons that have been scattered (line 704) and thus reached the detector from directions away from the radiation source. FIG. 7 also illustrates that the difference in spectrum of scattered photons compared to primary photons can be used to distinguish primary photons for imaging purposes by counting only those photons that have energies within an energy window 708 about the peak energy of the source gamma rays. FIG. 7 ignores the effect of charge sharing between pixels, which as described below, may result in a primary photon being measured by two or more pixels each at an energy that is less than the energy window due to energy being shared between the pixels.

Another factor affecting charge sharing between pixels is the size of the electron cloud generated when a photon is absorbed in the CZT detector. The term "cloud" is used to highlight the fact that the physical size of the electron charge is not a point but approximately a sphere with a certain radius. Each γ-ray photon absorbed in the CZT detector generates several thousands of electrons, so even the initial charge has finite physical dimensions. The number of generated electrons can be estimated by dividing the incoming photon energy by the CZT ionization energy of 4.64 eV. For example, a Technetium 99 gamma ray photon with an energy of 140 keV will produce about 30,000 electrons in the conduction zone, collectively carrying a charge of approximately 4.8 femto coulombs (fC).

Compton scattering of an incoming photon 802 may result in scattered photons interacting with CZT at several pixel sites. At each site of interaction, a Compton recoil electron or photoelectron will lose energy by generating a cloud of electrons by exciting electrons into the conduction band, creating electron-hole pairs.

Figure 8:
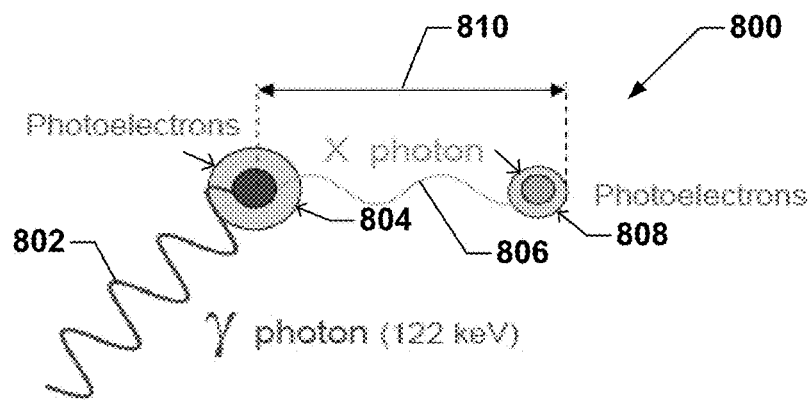
FIG. 8 is a diagram illustrating the relative path length of photo electrons versus emitted x-ray photons following photoelectric absorption of a gamma photon in a CZT detector.

Similarly, the photo-electric effect may result in interactions at several sites as illustrated in the diagram 800 in FIG. 8. When an incoming photon 802 is absorbed by an atom in the photo-electric effect, the ejected photoelectron carries with it the energy of the photon minus the binding energy of the particular electron ejected from the atom. The energy of the photoelectron is then dissipated as it excites electrons into the conduction band (and thus generates holes), creating a cloud of electrons 804 along its path of travel. The range of a photoelectron in CZT depends on the energy carried off by that electron. For example, a 40 keV photoelectron is stopped in CZT within about 10 µm, whereas a 100 keV photoelectron is stopped in CZT within about 47 µm. The clouds of electrons (and holes) generated by a photoelectron are not uniform in charge density, because electron-hole production increases towards the end of the track of the photoelectron. For a 100 keV photoelectron, 30% of the electron-hole pairs are created in the last 7 μm of its track through the CZT material. Additionally, an X-ray 806 of 25 keV may be produced in the initial interaction, and such an X-ray may have mean free path 810 of about 85 μm before it too is absorbed via the photo-electric effect. The electron cloud 808 generated by absorption of the X-ray 806 will add to the overall distribution of charge in the detector.

Figure 4:
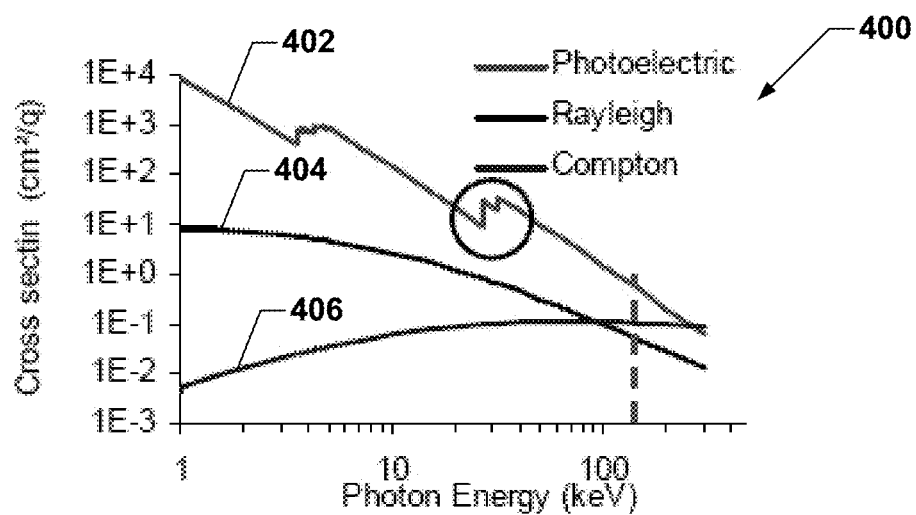
FIG. 4 a graph of cross-sections for photoelectric, Rayleigh scattering and Compton scattering interactions in a CZT detector as a function of photon energy.

The proportions of interactions of gamma photons with the CZT detector via the photo-electric effect versus Compton scattering can be calculated using values from FIG. 4.

As the above discussion indicates, the process of electron cloud generation is rather complex and accurate predictions of the electron cloud size are difficult without resorting to comprehensive numerical methods. Monte-Carlo simulations indicate that although the size of the cloud varies with the incoming photon energy, it is generally small, ranging from a few microns for low energies to several micrometers at the higher energy end. For purposes of developing methods of the various embodiments, and initial electron cloud radius of 10 μm is presumed for photons with medium energies of 122 to 140 keV. Accurate knowledge of size of the initial electron cloud is not critical since the electron cloud is much larger by the time the charge drifts to the anode.

The electron cloud consists of several thousand individual electrons that drift towards the anode side of the detector. Since the distribution of electrons in the cloud is not uniform the electrons are subject to a diffusion process governed by Fick's diffusion law. In addition, electrons experience electrostatic repulsion from one another. Diffusion and repulsion act together to expand the electron cloud until the electrons reach the anode.

As described with reference to FIG. 2, the generated electron-hole pairs separate under the influence of the internal electric field created by the voltage applied between the anode and cathode, with the generated electrons moving toward the anode. The generated holes drift towards the cathode, but as hole mobility in CZT is very low, the effect of charge sharing between pixels is dominated by the electron movements. Thus, methods for accounting for charge sharing can assume that the generated holes do not move. The time required for electrons to separate from holes is in the order of a nanosecond and therefore can be neglected as well.

Figure 9:
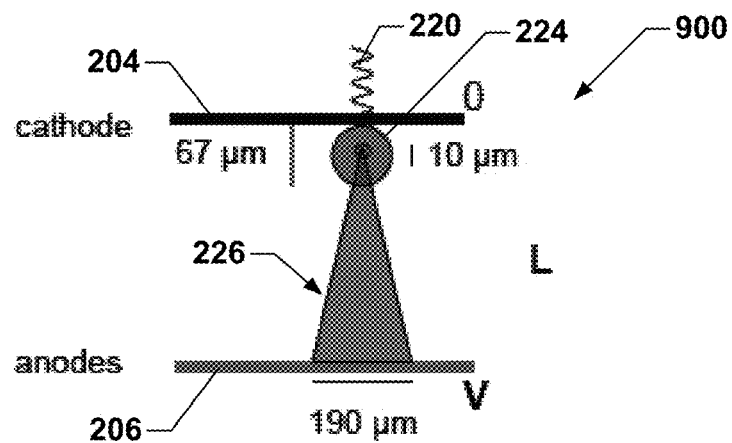
FIG. 9 is a diagram illustrating expansion of an electron cloud due to diffusion and repulsion affects.

Referring to the diagram 900 in FIG. 9, as a photon-generated electron cloud 220 moves toward the anode 206, the size of the cloud will grow due to carrier diffusion and charge repulsion mechanisms. As the size of the electron cloud 226 grows due to these two effects, the electron cloud may start to become comparable to the pixel size, and thus induce charges on adjacent pixels. Depending on the threshold voltage settings of the SPECT read-out electronics, the charges within the electron cloud may be detected by more than one channel or pixel using spectroscopic electronics, such as a spectroscopic Application Specific Circuit (ASIC), capable of detecting events happening simultaneously in two or more pixel detectors.

As a result of the diffusion and repulsion processes, electron cloud spreads uniformly in size as schematically illustrated in FIG. 9. In the example shown in FIG. 9, the initial cloud is 67 μm wide with a characteristic sigma of 10 μm. By the time the cloud 226 reaches the anode 206 it is 190 μm wide. This spreading effect is highly dependent on the electric filed intensity. These dimensions of the electron cloud are examples and the actual dimensions of each electron cloud will vary depending upon the energy of the incoming gamma photon, the manner in which the gamma photon interacts with the detector materials, the temperature and pressure of the detector, and other factors.

Precise estimation of the diffusion spread can be obtained by numerically solving Fick's equation in a 3-D space. However, analytical approximations provide useful insight. For an initial delta function charge distribution (zero effective cloud size), the diffusion equation can be solved analytically to produce an effective sigma distance σ as:

$$\sigma^2 = 4Dt_{drift} \quad (1)$$

where D is the diffusion coefficient of electrons in CZT and tdrift is a drift time from the initial interaction until the electron charge reaches the anode. The diffusion coefficient can be obtained using Einstein's relationship:

$$D = \mu_n kT/q \quad (2)$$

where μn is electron mobility in CZT.

The drift time can be obtained assuming uniform electric field distribution in the CZT detector, the assumption that is typically valid within 95% of the detector body, as:

$$t_{drift} = d^2/(\mu_n V) \quad (3)$$

where d is the detector thickness and V applied high voltage. Substituting (3) into (1) the following final expression is obtained:

$$\sigma^2 = 4kTL^2/qV \quad (4)$$

The final result in equation 4 reveals that the electron cloud spreading process is independent of the electron mobility value. This can be understood from the fact that while higher mobility leads to faster drift and shorter drift time it also leads to a higher diffusion constant through Einstein's relationship. The final result in equation 4 also indicates that the only physical parameters affecting the charge spreading process are the detector thickness L and the applied bias V since kT/q is a physical constant that is only mildly varying, as the CZT temperature is typically kept constrained in a tight range during detector operation.

For typical spectroscopic CZT detectors with thickness L of 5 mm and high-voltage bias V of 1000 V, the characteristic distance σ can be calculated from equation 4 as 50 μm. Thus, the electron cloud is about 150 μm assuming 3-sigma measure and that the electron distribution within the cloud is Gaussian. An electron cloud of 150 μm radius is comparable to the pixel size of 1.5-2.5 mm, which is the size of pixels typically being used in SPECT.

It should be noted that equations 1 and 4 are first order approximations that take into account only a diffusion process. A more elaborate formula that takes into account both diffusion and drift is:

$$\Delta \sigma_{x,y,z}^2 = 2\left(D + \frac{1}{15}\left(\frac{3\mu Ne}{4\pi\varepsilon_0\varepsilon_R}\right)\frac{1}{\sqrt{5}\,\sigma_{x,y,z}}\right)\Delta t \quad (5)$$

where the first term D represents a diffusion process while the second term represents drift. N is the number of electrons in the charge cloud, e is the electron charge and εR is CZT relative permittivity. Note that equation 5 simplifies to equation 1 if the drift process is neglected. An interesting observation provided by equation 5 is that the drift repulsion effect increases with the number of electrons N, and thus, charge-sharing effects increase with the photon energy.

Figure 10:
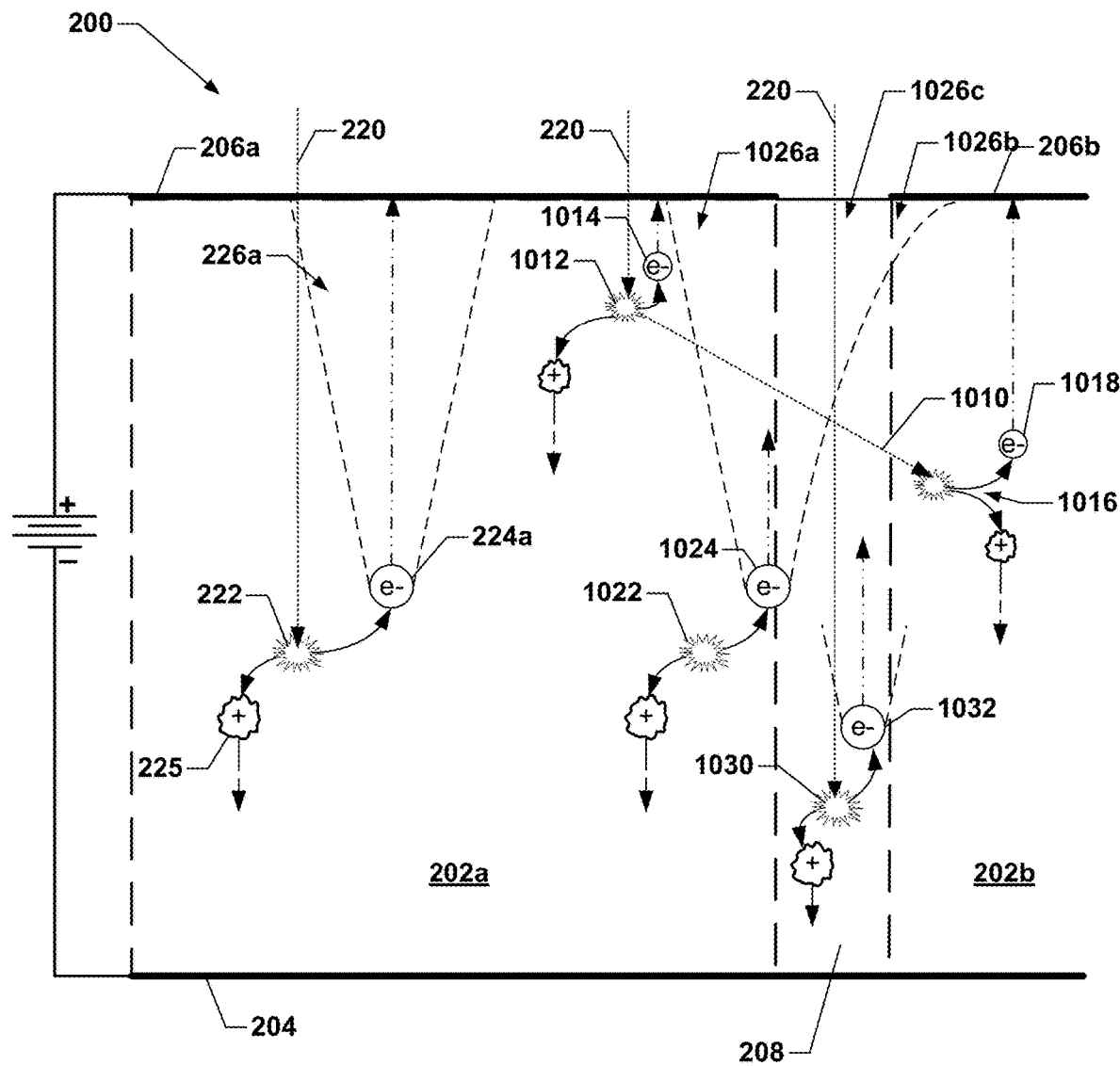
FIG. 10 is a conceptual cross section view diagram of a semiconductor pixel radiation detector illustrating gamma-ray interactions that lead to charge sharing between pixels.

FIG. 10 is a cross-section diagram of two pixels 202a, 202b within a CZT detector 200 illustrating the various interactions and sources of cross sharing of charge clouds discussed above. As described with reference to FIG. 2, nominally gamma rays 220 will interact by the photoelectric effect and/or Compton scattering at one or more events 222, resulting in an electron cloud 224a that drift towards the anode 206a and a corresponding cloud of holes 225 that drift toward the cathode 204. As noted above, the electron cloud will expand in diameter due to diffusion and repulsion is shown at 226a, but if the interaction 222 occurs away from the boundaries of the pixel 202a, the entire charge of the electron cloud will be collected on the anode 206a.

If the incoming gamma-ray 220 interacts with the CZT detector material via Compton scattering 1012 close to a boundary of a pixel 202a, a recoil electron may produce a local electron cloud 1014 in that pixel 202a, while the recoil gamma-ray follows a path 1010 that terminates in an adjacent pixel 202b via a photoelectric effect event 1016 that ejects a photoelectron that produces an electron cloud 1018. In this situation, the charge resulting from the electron cloud 1014 generated by the Compton scattering event 1012 will be collected by the first pixel's anode 206a, while the charge resulting from the electron cloud 1018 generated by the photoelectric affect event 1016 will be collected by the second pixel's anode 206b. When this happens, counsel be recorded in both pixels 202a, 202b but with lower energies then that of the incoming gamma ray 220.

If the incoming gamma-ray 220 interacts with the CZT detector material via the photo electric effect close to a boundary of a pixel 202a as illustrated in event 1022, the resulting electron cloud 1024 may expand under diffusion and repulsion processes to encompass both the anode 206a of that pixel (portion 1026a) and the anode 206b of the adjacent pixel 202b (portion 1026b). Additionally, some of the charge in the expanded electron cloud may be trapped in surface defects within the CZT material 208 between the two pixels (portion 1026c). Such charge sharing will result in signals recorded on two pixel anodes 206a, 206b for the single absorption event 1022, but at energies lower than that of the incoming photon 220.

Some incoming gamma-rays 220 will also interact with the CZT detector material between two pixels 202a, 202b as illustrated in event 1030, because the pixels are positioned a finite distance apart. In some cases, the resulting electron cloud 1032 may expand under diffusion and repulsion processes sufficient to encompass both anodes 206a, 206b, with some of the charge in the expanded electron cloud being trapped in surface defects within the CZT material 208 between the two pixels. In such cases, the charge sharing will result in signals recorded on two (or more) pixel anodes 206a, 206b for the single absorption event 1022, but at energies lower than that of the incoming photon 220. In other cases, such as when the inter-pixel photon interaction 1030 occurs near the anodes 206a, 206b, there may be insufficient time for the resulting electron cloud 1032 to expand sufficiently to encompass one or both of the adjacent anodes 206a, 206b, in which case the charge may be trapped in surface defects of the inter-pixel material 208 with no count.

Figure 11:
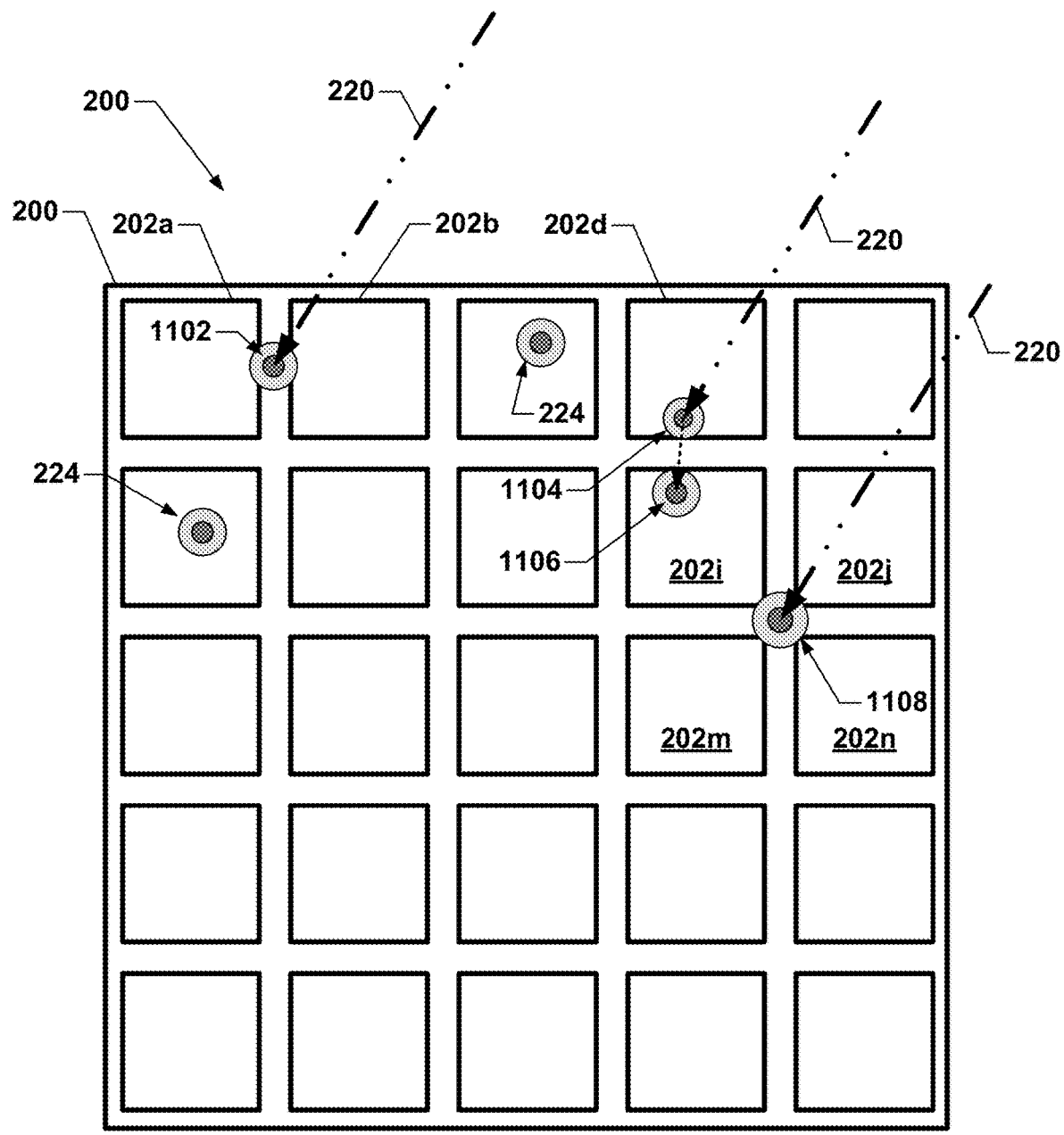
FIG. 11 is a conceptual top view diagram of a semiconductor pixel radiation detector illustrating gamma-ray interactions that lead to charge sharing between pixels.

FIG. 11 illustrates the charge sharing events from a top view of a pixelated CZT radiation detector 200. In addition to the absorption of events with electron clouds 224 retained within the pixels described with reference to FIG. 2, some gamma rays will interact with the detector 200 between pixels or close to the boundary of axles resulting in charge sharing between two or more pixels. For example, a photon absorbed between two pixels as illustrated in event 1102 may result in the electron cloud 1102 being shared between the two adjacent pixels 202a, 202b. As another example, a gamma-ray photon 220 may generate a first electron cloud 1104 in a first pixel 202d via a Compton scattering event and generate a second electron cloud 1106 when the recoil photon is absorbed a second pixel 202i such as via the photoelectric effect. As a further example, a gamma-ray photon 220 may be absorbed within the inter-pixel volume between three or four pixels 202i, 202j, 202m, 202n, in which case some of the resulting electron cloud 1108 may be absorbed in any one or all of the adjacent pixels, as well as within surface defects within the inter-pixel space.

Figure 12A:
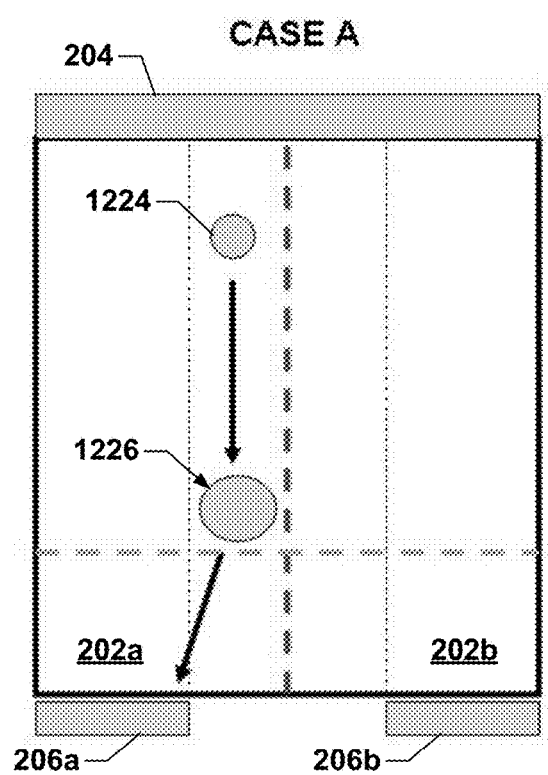
FIGS. 12A-12C are conceptual cross section view diagrams of a semiconductor pixel radiation detector illustrating migration of an electron cloud within an inter-pixel gap.
Figure 12B:
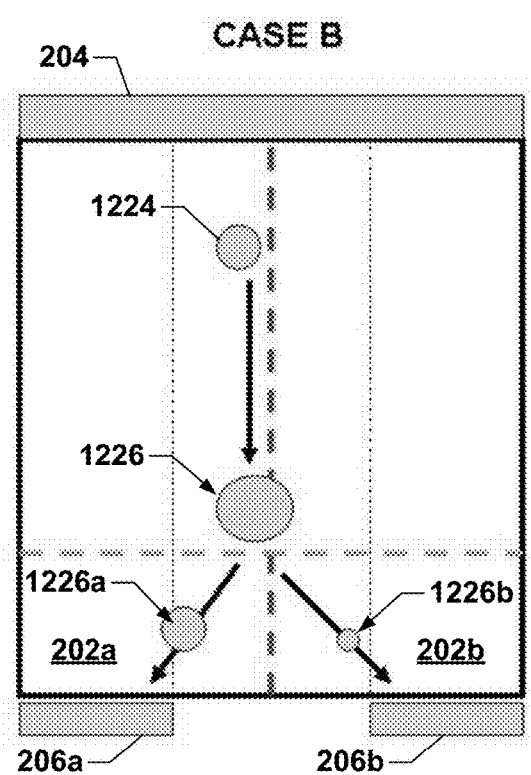
Figure 12C:
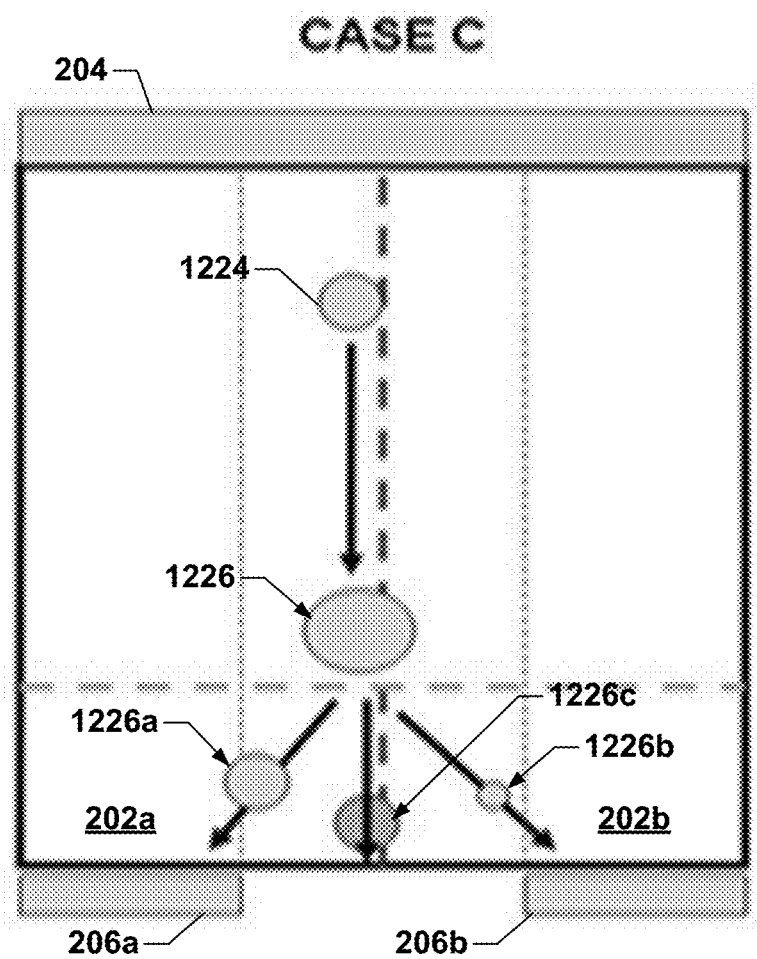

Charge sharing effects that may occur when photon interactions occur within the inter-pixel volume is further illustrated in FIGS. 12A-12C.

Referring to FIG. 12A, a charge cloud 1224 generated due to a gamma-ray interaction within an inter-pixel gap but close to the CZT cathode close to the boundary of a pixel 202a, the charge 1226 may drift towards only one pixel 202a under the influence of the applied electric field that pixel's anode 206a.

Referring to FIG. 12B, a charge cloud 1224 generated due to a gamma-ray interaction close to the CZT cathode and towards the middle of an inter-pixel gap, the charge 1226 may split under the influence of the magnetic field generated by the anodes 206a, 206b of adjoining pixels 202a, 202b, resulting in two charges 1226a, 1226b that may be detected by the respective pixels. As the charge 126 is split into two charges 1226a, 1226b, the signals measured by the pixels 202a, 202b will be less than present in the initial charge cloud 1224 and may not be equal.

The movement of charges illustrated in FIGS. 12A and 12B somewhat simplistic because the illustrations neglect surface effects at the inter-pixel gap. Experimental data has confirmed that imperfections in the surface passivation of the CZT material in the inter-pixel gap surface can result in absorption of some of the charge cloud that falls within the gap. This is illustrated in FIG. 12C, which shows that a portion 1226c of the charge drifting in the inter-pixel gap is trapped by a surface region. Modeling of the portion of the charge trapped by the surface region in the inter-pixel gap is difficult as the electric field there has both vertical and lateral components. In addition, the surface region may contain significant number of trapping sites (surface shallow and deep level traps) due to imperfect passivation of the CZT material. However, some simplifying assumptions may enable estimating the effects of this charge-loss phenomena. At the surface, electrons experience a small electric field in the lateral (anode to anode) direction compared to the vertical (cathode to anode) direction field that drove movement from the place of the photon interaction. However, the electron cloud is still subject to the diffusion process, and as long as the electron cloud remains at or near the surface of the inter-pixel gap the charge will diffuse towards the adjacent pixels even if the cloud is much closer to one of the pixels than the other. The exact portion of the charge going to the adjoining pixels may be estimated based on the physical position of the cloud with respect to the two pixels 202a, 202b.

Figure 12D:
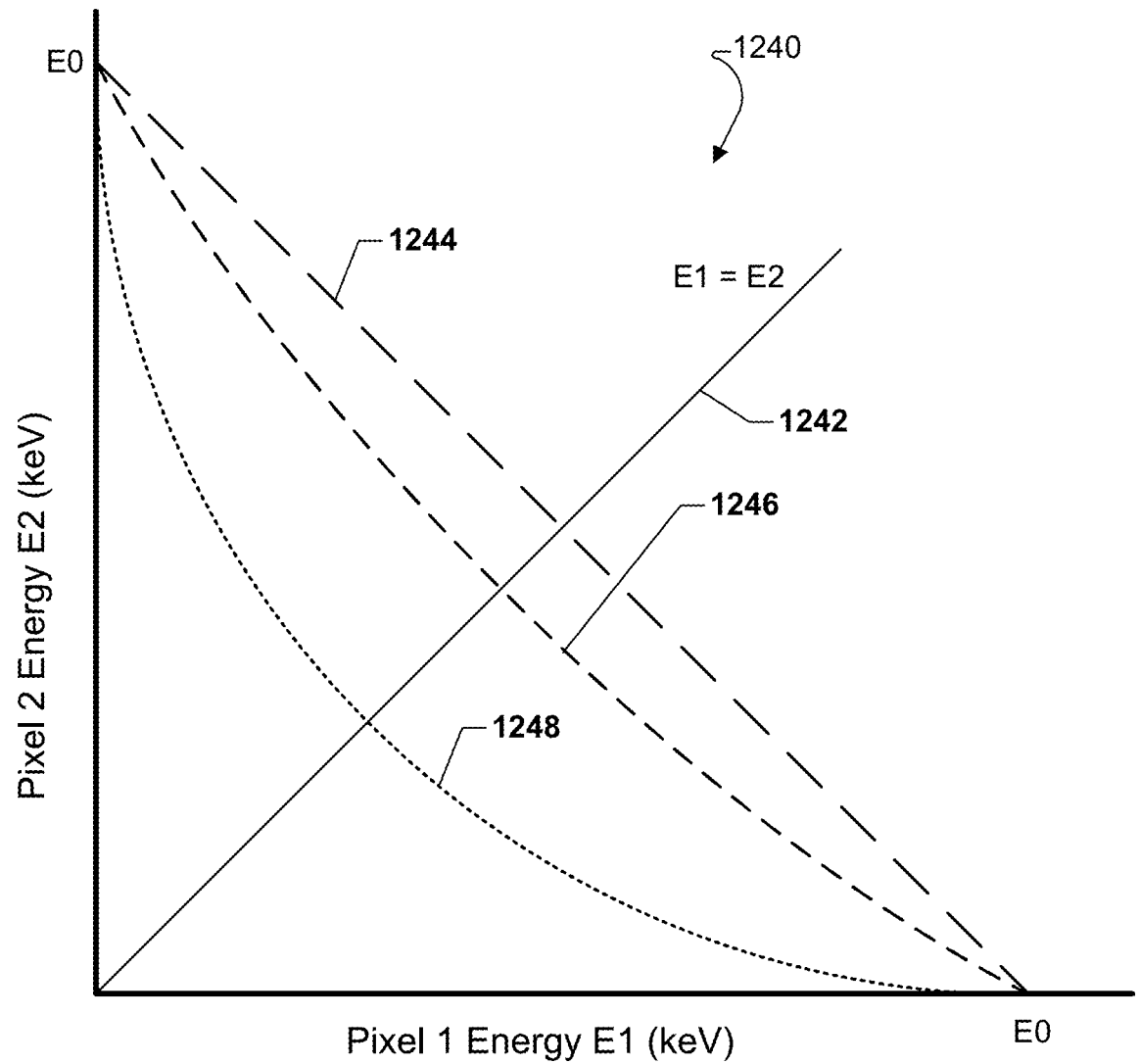
FIG. 12D is a notional graph illustrating charge sharing between adjacent pixels and the effects of charge loss for photon absorption events occurring in the inter-pixel gap.

FIG. 12D illustrates graphically how the amount of charge loss due to charges being trapped by the surface region in the inter-pixel gap may affect the amount of charge gathered and thus detected photon energy (keV) measured by adjacent pixels. The graph 1240 illustrates how when there is no charge loss due to surface effects or deep traps (line 1244), the sum of the energies measured in the adjoining pixels will equal the actual energy E0 of the detected photon (i.e., E0=E1+E2). When the inter-pixel gap exhibits some charge loss (lines 1246 and 1248), the sum of the energies measured in the adjoining pixels (i.e., E1+E2) will be less than the energy of the detected photon due to the charge loss (CL), and thus E0=E1+E2+CL. Further, the effect of inter-pixel charge loss is greatest when photons are stopped in the middle between two pixels (i.e., close to where E1=E2), and decreases toward zero as the measured energy is increasingly measured in just one pixel. For detectors that exhibit a small inter-pixel gap charge loss as illustrated in line 1246, the charge loss CL may be small enough that the photon energy E0 is approximately equal to the sum of the energies measured by two pixels (i.e., E0≈E1+E2). However, for detectors that exhibit a large inter-pixel gap charge loss as illustrated in line 1246, as may be the case for detectors with a relatively large inter-pixel space and/or poor surface passivation, the charge loss CL may be significant, leading to errors in measured spectrum.

Experiments using $Cd_{0.9}Zn_{0.1}Te$ detectors with various thickness (from 2 mm to 5 mm) made using various ways of manufacturing the passivation and measured with either spectroscopic or photon counting electronics, measured inter-pixel charge loss to be 10-15%, although occasionally much larger losses were observed for large (relative to the pixel size) inter-pixels gaps. The inter-pixel charge losses were dominated by double-pixel events as triple and multiple events (more than 3 pixels triggered at the same time such as 1108 in FIG. 11) were observed to be insignificant with low numbers of detected events.

In experiments, charge sharing results were obtained using a $^{57}Co$ source illuminating two different 4×4 pixel array detectors having the configuration illustrated in FIG. 13A. One array detector had a gap between the pixel electrodes of 0.1 mm, and the other array detector had a gap of 0.46 mm, both with a 2.46 mm pixel pitch. In these experiments, the pixel count data were recorded with a bias voltage of −300V and −800V at a temperature of 22° C. The average total electronic noise for the setup was 2.5 keV FWHM. The energy resolution of the detector samples (for the single pixel events) for all pixels was measured to vary between 5 and 9 keV FWHM at the 122 keV peak. Charge sharing events between pixels were observed by detecting coincident events in adjacent pixels. The time coincident spectra were recorded with a bias voltage of −800V at a temperature of 22° C. Plots of shared events between center pixel 6 and adjacent pixels 2, 5, 7 and 10 in FIG. 13A that were observed in experiments are presented in FIG. 13B for the array detector with a gap between the pixel electrodes of 0.46 mm, and in FIG. 13C for the array detector with a gap between the pixel electrodes of 0.1 mm.

Comparing FIGS. 13B and 13C, a clear pulse height loss for charge shared events appears most pronounced for the detector with the larger pixel gap (FIG. 13B). This effect is illustrated in FIGS. 13B and 13C using a 2D representation that gives the pulse height of shared events between one pixel (i.e., pixel 6 in FIG. 13A) and its neighbors (i.e., pixels 2, 5, 7 and 10 in FIG. 13A).

Ideally, the sum of the energies recorded as shared events by two pixels should add up to the full energy E0=E1+E2, as illustrated in line 1244 of FIG. 12D. This would be showing in FIGS. 13B and 13C as a straight line E2=E0−E1. That is approximately the case in FIG. 13C for the inter-pixel gap of 100 um, although some slight departure from linearity can be observed, as illustrated in line 1246 in FIG. 12D. However, the 2D plots in FIG. 13B show a clear bending for the 0.46 mm gap data. The curvature shows that the shared events do not have 100% efficient charge collection and that charge loss is the largest for those events that are stopped in the middle between two pixels, as illustrated in line 1248 in FIG. 12D. Moreover, this charge loss increases with the pixel gap. The results indicate that charge from the events stopped in between the pixels (e.g., events 1030 in FIG. 10) in detector arrays with large gaps between pixels will end up in the surface layer between the pixels and that charge effectively is trapped there. These events will therefore not induce their full signal in the pixel electrodes leading to errors in measured spectrum.

The result of this analysis and experimental data were used to develop the embodiment methods for accounting charge sharing between pixels of a pixelated radiation detector.

Figure 14A:
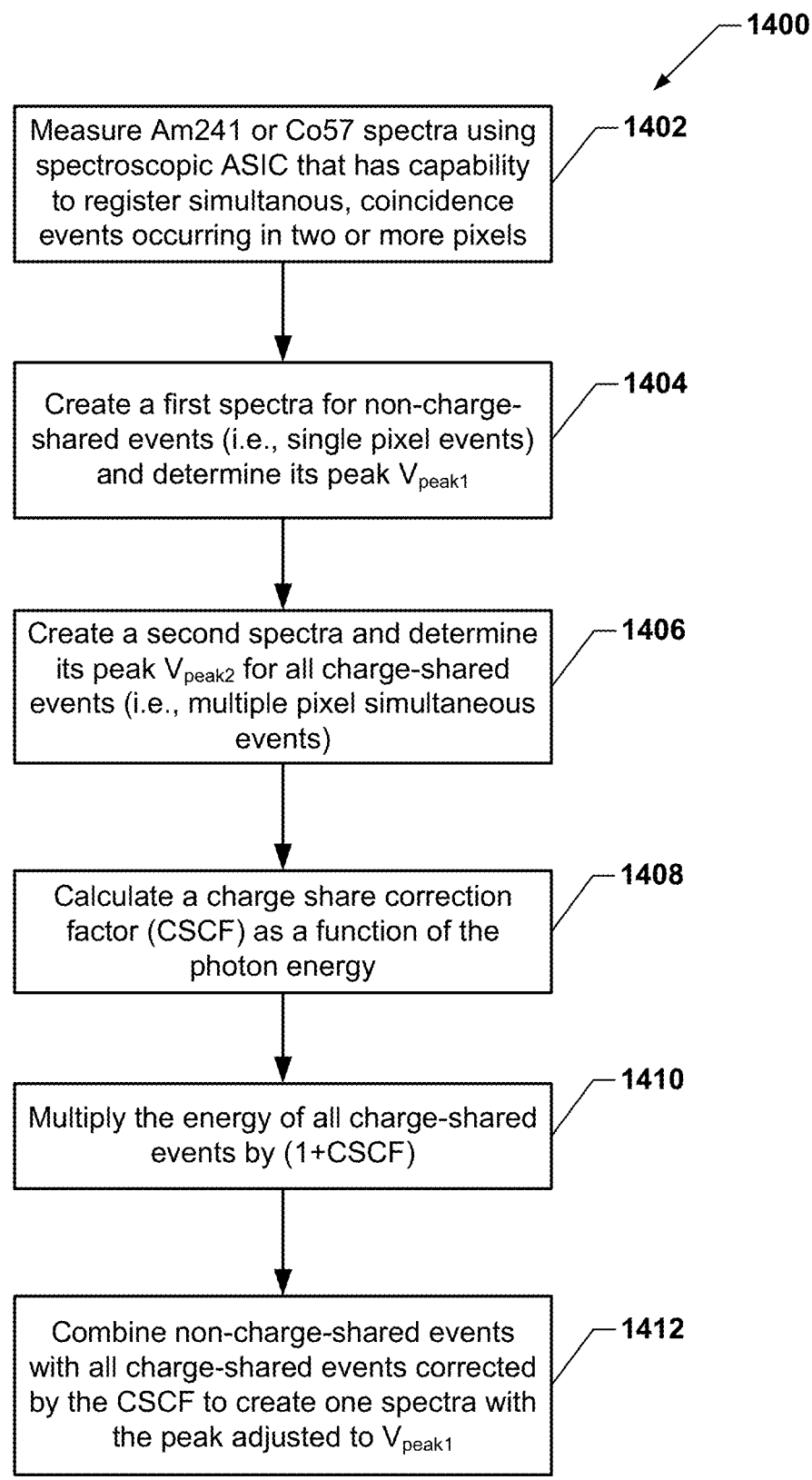
FIGS. 14A and 14B are process flow diagrams illustrating methods of compensating for charge share affects in pixel radiation detectors according to various embodiments.

FIG. 14A illustrates a method 1400 for calibrating pixel radiation detectors and adjusting the output of such detectors to account for charge sharing effects according to various embodiments. The method 1400 may be implemented by a processor of a computing device (e.g., the computer 112 of FIG. 1 or the computing device 1900 of FIG. 19).

In step 1402, the processor may measure the energy spectra of radiation received on a pixel radiation detector from an Am241 or Co57 source using any suitable spectroscopic ASIC device that has capability to register simultaneous, coincidence events on multiple pixels.

In step 1404, the processor may create a first energy spectra for detection events occurring in single pixels and determining its peak value $V_{peak1}$. In some embodiments, the processor may create the first spectra for the non-charge-shared events detected by the spectroscopic ASIC device, and use the results to determine a peak value $V_{peak1}$ using normal analysis algorithms.

In step 1406, the processor may create a second energy spectra for detection events occurring simultaneously in two or more pixels and determining its peak value $V_{peak2}$. In some embodiments the processor may create the second spectra for all charge-shared events detected by the spectroscopic ASIC device, and use the results to determine a peak value $V_{peak2}$.

In step 1408, the processor may determine a charge sharing correction factor (CSCF) as a function of the photon energy in adjoining pixels using data obtained from calibration data, such as illustrated in FIGS. 13B and 13C. As illustrated in FIG. 12D, inter-pixel charge loss will be greatest when the charges measured by the adjoining pixels is equal or nearly equal, and decreases asymptotically as the difference in measured energy between the two pixels increases. Thus, the photon energies measured in adjacent pixels in a two-pixel charge-sharing scenario will be divided between the two pixels minus the charge loss. For example, if the photon energy is 60 keV, the measured energies between the two pixels may be 24 keV and 34 keV or 25 keV and 35 keV. When the energies measured in the adjacent pixels is equal, the charge loss (say 10 keV) will be greatest, so the 60 keV photon will be measured as two photons of 25 keV in adjoining pixels with 10 keV consumed by the inter-pixel charge loss. When the energies are not equally divided between the two pixels, the inter-pixel gap charge loss will be smaller. For example, the 60 keV photon might be measured as two photons of 20 keV and 32 keV in the adjoining pixels with 8 keV consumed by the inter-pixel charge loss. The closer the measured energy in one pixel approaches that of the absorbed photon, the less the energy that will be consumed by the inter-pixel charge loss. By collecting data on measured energies in adjoining pixels from inter-pixel gap events during a calibration exposure, a charge sharing correction factor can be determined that accounts for observed charge sharing losses.

In step 1410, the processor may adjust energy measurements of detection events occurring simultaneously in two or more pixels by a charge sharing correction factor. In particular the processor may multiply the energy of all detected charge-shared events by (1+CSCF), effectively shifting the energy of these events to the higher energies by the correction factor. For example, the charge sharing correction factor may shift energies of inter-pixel events by 10-15%.

In step 1412, the processor may determine a corrected energy spectrum by adding the adjusted energy measurements of detection events occurring simultaneously in two or more pixels to energy spectra of detection events occurring in single pixels. Thus, the processor may combine the non-charge-shared events with all charge-shared events corrected by the charge sharing correction factor to create one spectrum with the peak adjusted to $V_{peak1}$.

The combined spectra created in step 1412 will offer accurate spectra with efficiency than achieved using conventional correction methods. Experiments have shown an in increase in efficiency of 40-50% while maintaining accurate energy resolution compared to other methods.

In various embodiments, the operations in steps 1402-1408 may be performed during a calibration procedure, such as during manufacture of the radiation detector and/or during service of a gamma camera using a gamma source with a known gamma ray energy and flux, while the operations in steps 1410 and 1412 are performed during imaging operations of the gamma camera.

Figure 14B:
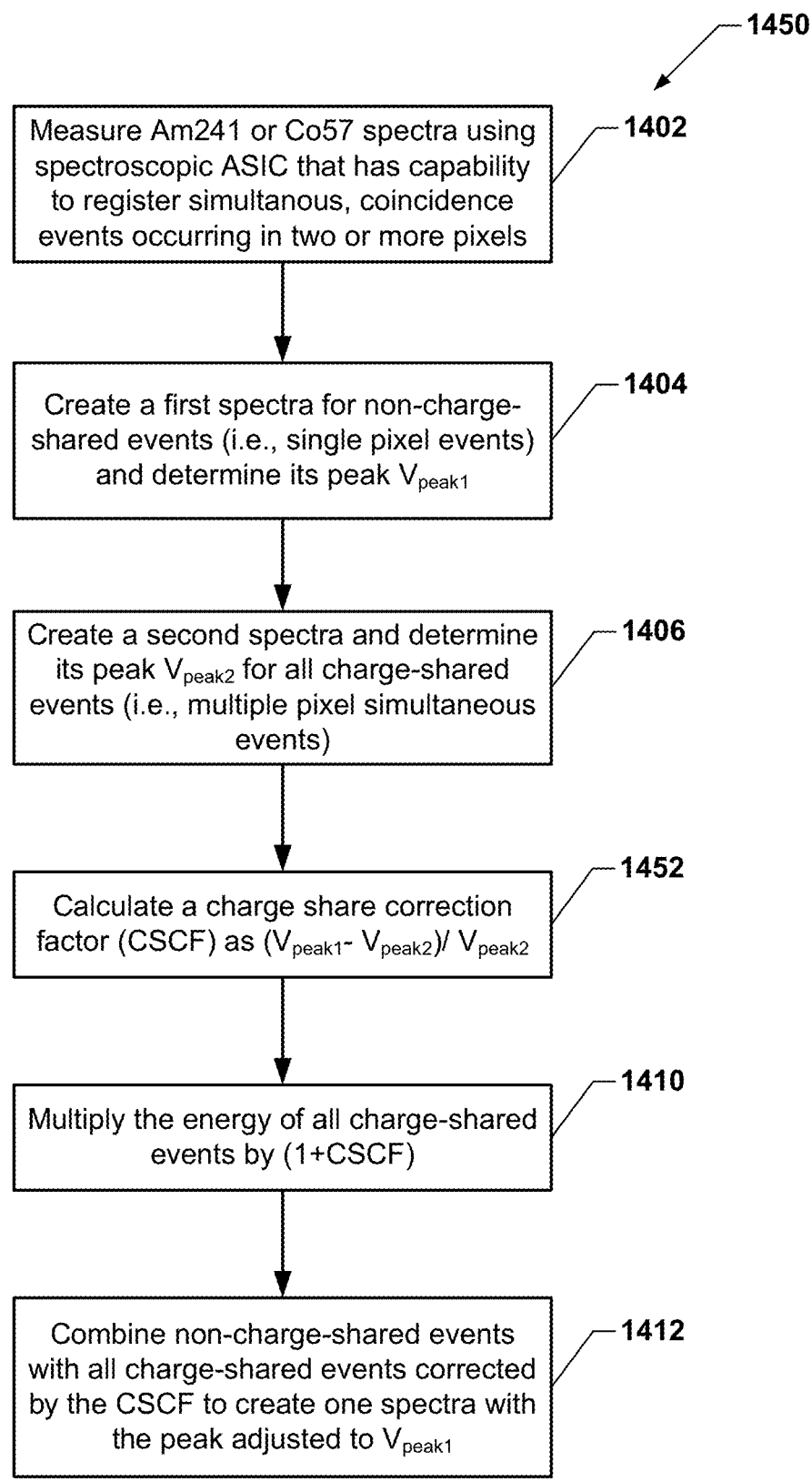

FIG. 14B illustrates another method 1450 for calibrating pixel radiation detectors and adjusting the output of such detectors to account for charge sharing effects according to another embodiment. The method 1450 may be implemented by a processor of a computing device (e.g., the computer 112 of FIG. 1 or the computing device 1900 of FIG. 19).

In the method 1450 the steps 1402 to 1406 may be performed as described above for the method 1400.

In step 1452, the processor may calculate the charge sharing correction factor (CSCF) using the formula ($V_{peak1}$−$V_{peak2}$)/$V_{peak2}$. Typically, this will be about 10-15%, but may be larger for detectors with a large inter-pixel gap with respect to the pixel pitch. Depending upon the inter-pixel gap and the quality of the surface passivation, this number can vary from 0 to 50%.

In various embodiments, the operations in steps 1402-1406 and 1452 may be performed during a calibration procedure, such as during manufacture of the radiation detector and/or during service of a gamma camera using a gamma source with a known gamma ray energy and flux. The operations in steps 1410 and 1412 are performed as described above for the method 1400 during imaging operations of the gamma camera.

The calibration operations illustrated in the embodiment methods 1400 and 1450 may be performed after manufacturing on a per detector basis in order to accommodate differences in inter-pixel gap charge loss resulting from differences in surface passivation that may occur from fabrication lot to fabrication lot, from detector to detector within a fabrication lot. Alternatively, the calibration operations illustrated in the embodiment methods 1400 and 1450 may be performed after detectors have been assembled into a gamma camera, such as part of initial and/or periodic calibrating the camera and imaging system. The calibration operations illustrated in the embodiment methods 1400 and 1450 may be repeated across a range of temperatures at which the detector is expected to operate. Further, the calibration factors determined in steps 1408 and 1452 may be determined for each inter-pixel gap to account for the differences in surface passivation across each detector.

When the calibration operations in steps 1408 and 1452 are performed during or after fabrication, the correction factor(s) determined during calibration testing may be stored in FLASH memory of the detector module as part of steps 1408 and 1452, so that the correction factors are available for use in steps 1410 during operation of the detector. When the calibration operations in steps 1408 and 1452 are performed after assembly of the imaging system (e.g., a SPECT system), the correction factor(s) determined during calibration testing may be stored in memory of an analysis unit (e.g., 110) as part of steps 1408 and 1452, so that the correction factors are available for use in steps 1410 during operation of the imaging system.

As noted above, various embodiments reduce the area of each detector element to reduce the impact of dark current in CZT pixelated detectors by subdividing each pixel into an array of sub-pixel detectors. Said another way, each pixel within the pixelated radiation detector is composed of an array of sub-pixel detectors, with the sum of all outputs of the array of sub-pixel detectors allocated to a single pixel.

Figures 15A, 15B:
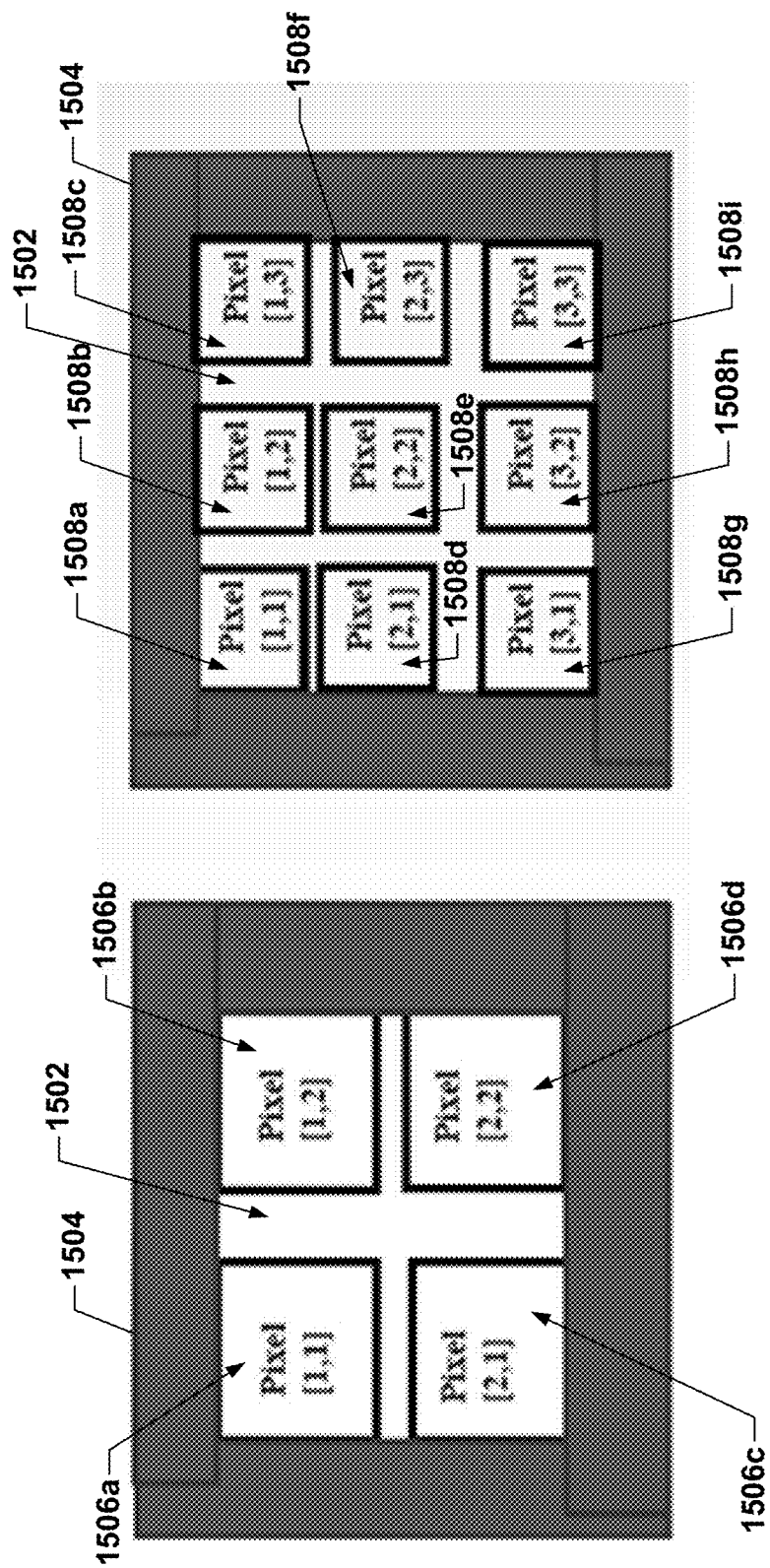
FIG. 15A and FIG. 15B illustrate a pixel subdivided into four and nine subpixels, respectively.

FIG. 15A illustrates a pixel 1502 that is formed from four sub-pixel detectors 1506a-1506c in a 2×2 array, with the pixel 1502 bounded by a collimator 1504. As another example, FIG. 15B illustrates a pixel 1502 that is formed from nine sub-pixel detectors 1506a-1506i in a 3×3 array.

Figure 16A:
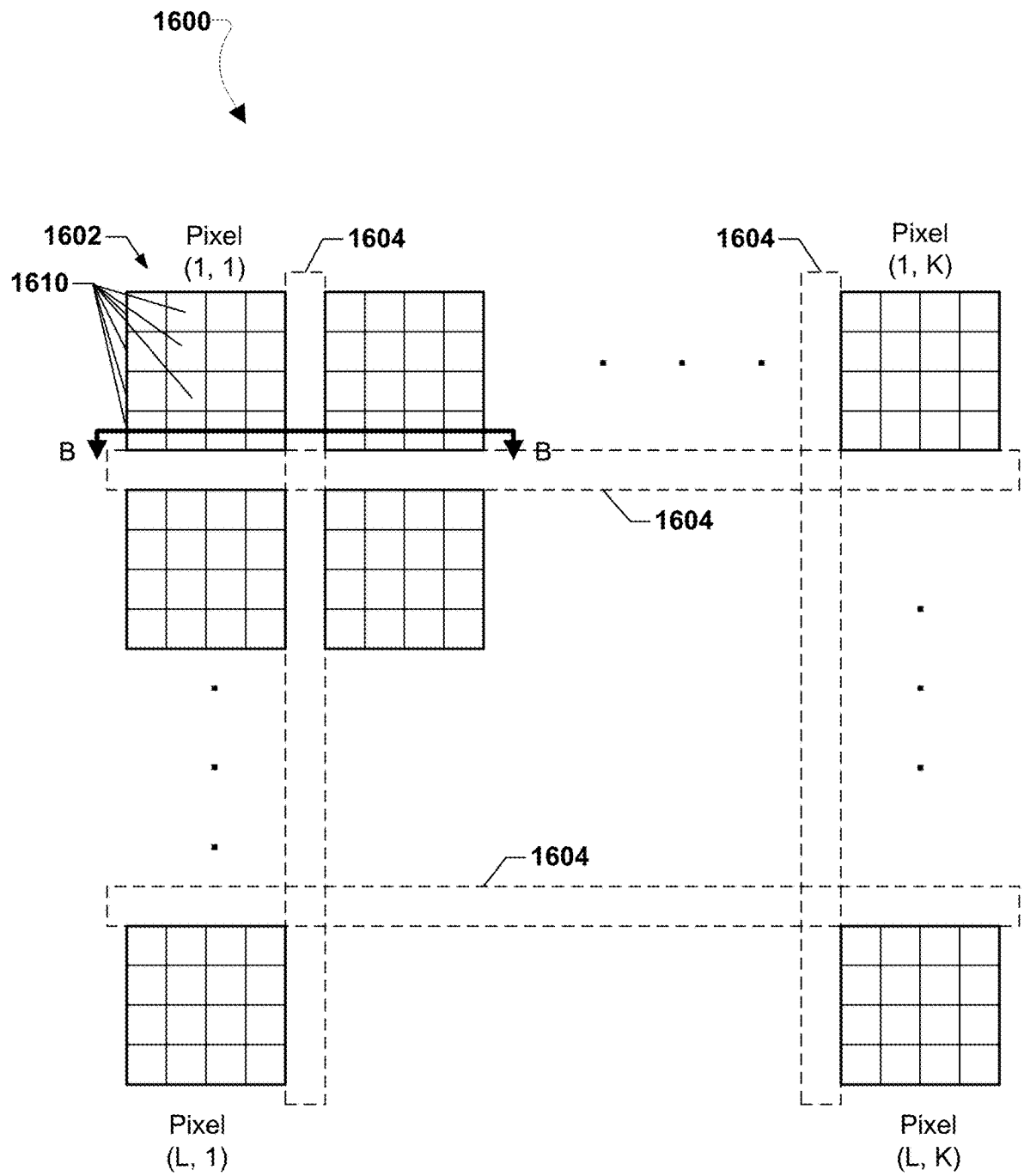
FIG. 16A and FIG. 16B illustrate a radiation detector array in which each pixel is form of an array of 16 subpixel detectors.

FIG. 16A is a component block diagram showing more details of a radiation detector array 1600 in which the pixels 1602 are formed from arrays of sub-pixel detectors 1610. The detector array 1600 may include a number of pixels 1602 arranged in an array or some other configuration. For example, the pixels 1602 may be arranged in a two-dimensional array with L rows and K columns, resulting in L×K number of pixels. Each pixel 1602 may include an array of smaller sub-pixel detectors 1610, each of which may be structured and function as described for pixel detectors 206 with reference to FIGS. 2-3. For example, each pixel 1602 may be 1 mm$^2$ in size and include a 4×4 array of sub-pixel detectors 1610, each sub-pixel detector having a size of 0.01 mm$^2$. Each sub-pixel detector 1610 may be connected to an associated pixel detector circuit, which may add together the outputs of the sub-pixel detectors 1610 within each pixel 1602 to provide the output for that pixel. Two examples of pixel detector circuits 1700, 1750 are described below with reference to FIGS. 17A-5B.

Various embodiments may include corrections to compensate for charge sharing events that occur between sub-pixel detectors within each pixel 1602 as described herein. To reduce charge sharing events between the pixels 1602, for example if a gamma ray strikes a boundary between two pixels, a collimator 1604 may be placed between each row and column of the pixels 1602. Each collimator 1604 may be used to absorb photons that strike in the boundaries between the pixels 1602, effectively reducing charge sharing events between the pixels 1602. For example, the collimators 1604 may help limit the angle of incidence of photons that strike the pixels 1602. A photon that comes in at a substantially non-perpendicular angle (e.g., ±5° or more from perpendicular) to the boundary of two pixels may be blocked by the collimators 1604, effectively preventing a given photon from being detected by sub-pixel detectors in more than one pixel. Meanwhile, photons that come in perpendicularly to the pixel surface may either strike a single pixel or the collimators 1604. The collimators 1604 may form a grid between the pixels 1602 in the radiation detector array 1600.

Thus, there may be a collimator 1604 located between each two pixels 1602 in the radiation detector array 1600, but there are no collimators between any two sub-pixel detectors 1610 within any one pixel 1602.

Each collimator 1604 may have a width of approximately 1-10 mm, and may have a height between 1-5 mm. No voltage may be applied to the collimators 1604. The collimators 1604 may be a grid-shaped wall or barrier composed of one or more of a variety of metals such as tungsten that absorb and dissipate photons. Alternatively, it may be possible to ignore charge losses from inter-pixel charge sharing events or have the pixel detector circuits calibrate out charge sharing events using reference calibration measurements using a known source signal, for example an X-ray flooded source.

Figure 16B:
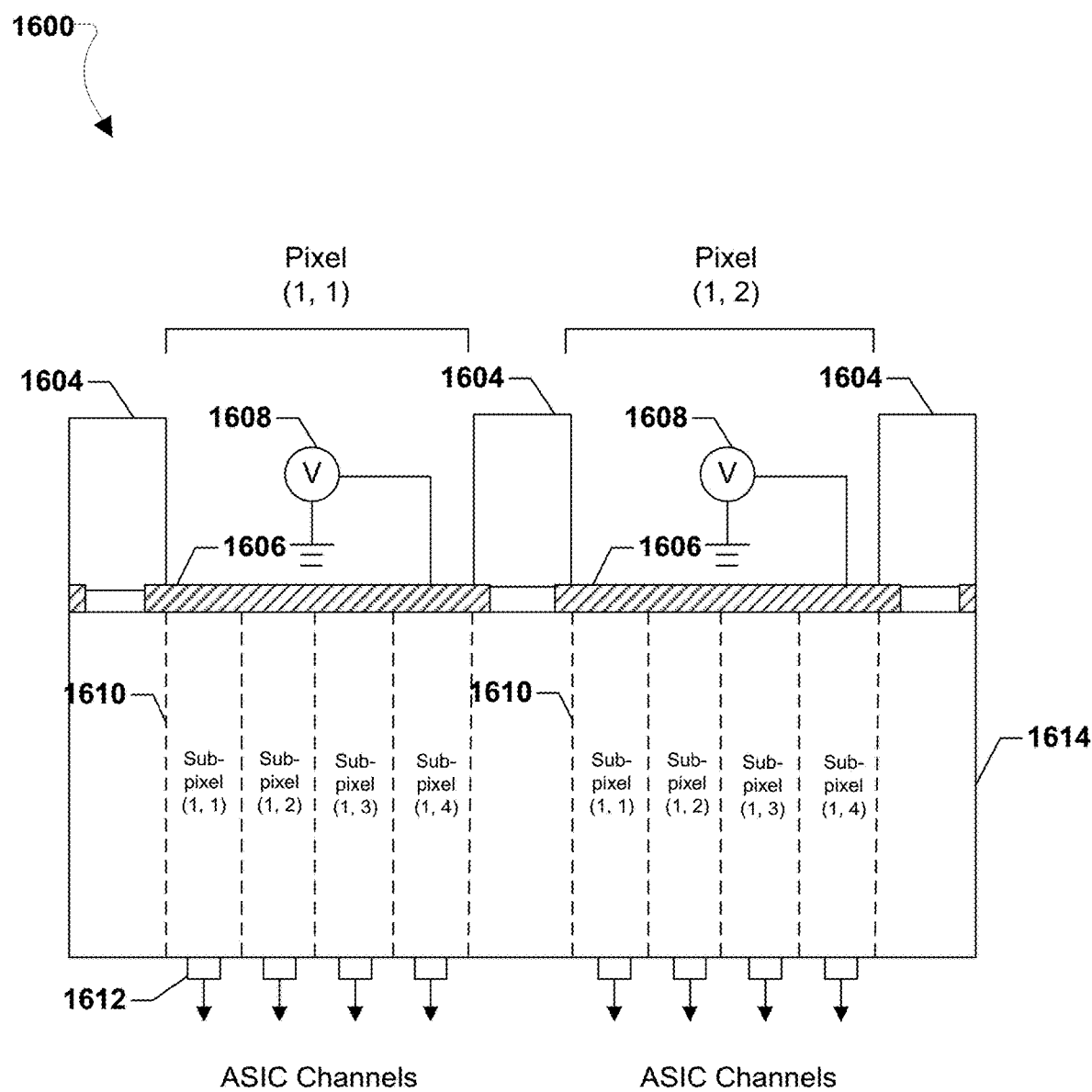

FIG. 16B is a side cross-sectional view of the radiation detector array 1600 along line B-B illustrated in FIG. 16A according to various embodiments. FIG. 16B illustrates a cross-sectional view of two pixels 1602 in the pixel detector array, denoted as pixel (1, 1) and pixel (1, 2). The pixels may be formed on a common substrate 1614, such as a CZT substrate. The pixels (1, 1) and (1, 2) may be separated from each other and from other pixels in the radiation detector array 1600 by the collimators 1604. The collimators 1604 may absorb photons that strike in the boundaries between the pixels, effectively preventing or reducing charge sharing events. The collimators 1604 may form a grid structure that separates each pixel 1602 from the other pixels in the radiation detector array 1600. There may be a small air gap between each collimator 1604 and the common substrate 1614.

Figure 17A:
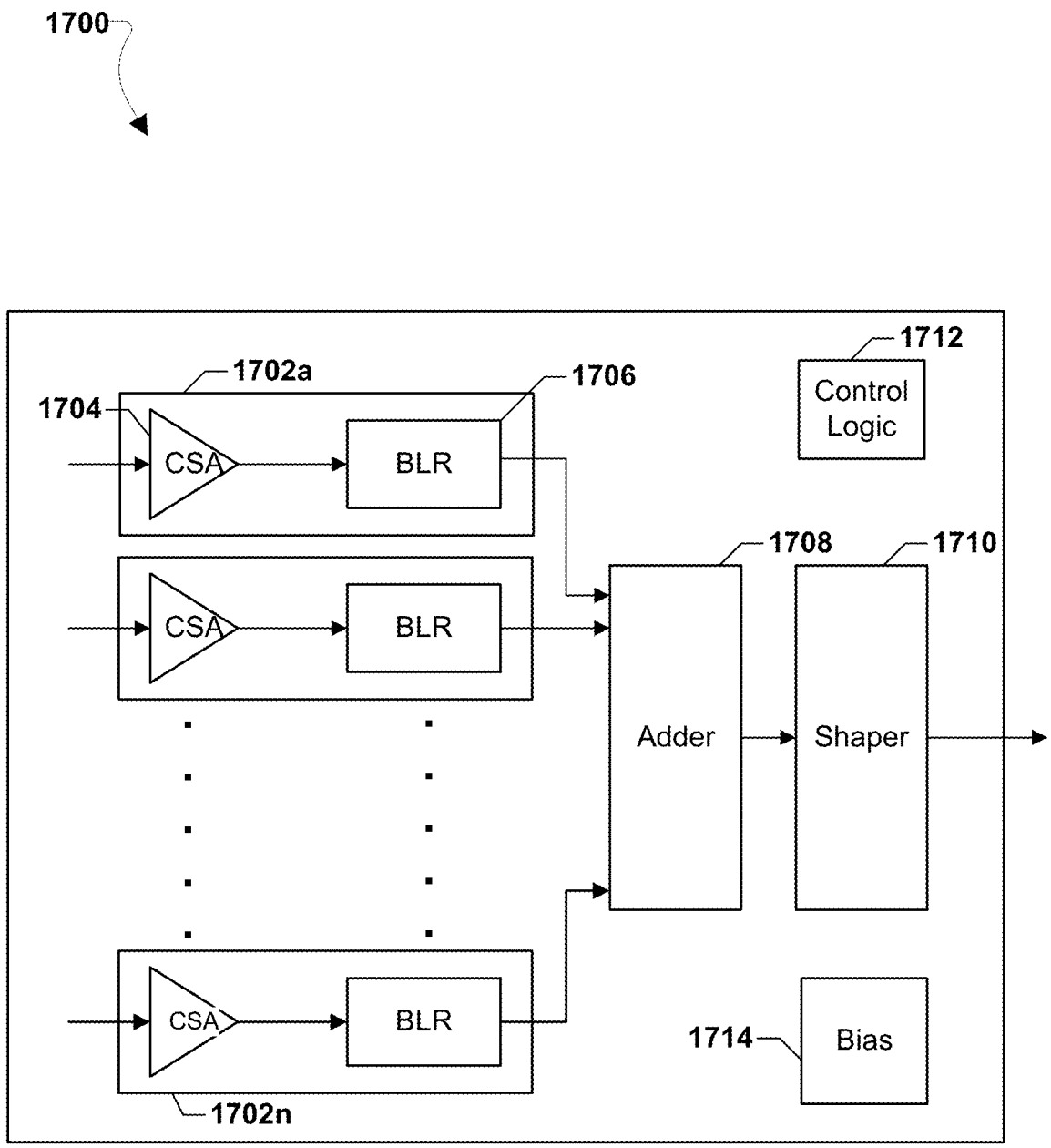
FIG. 17A and FIG. 17B are circuit block diagrams of examples of processing circuitry suitable for connecting to subpixel detectors and configured to process subpixel signals to determine detection measurements for pixels within the radiation detector array illustrated in FIGS. 16A and 16B.

FIG. 16B shows a cross-sectional view of sub-pixel detector arrays 1610, each having a row of four sub-pixel detectors (1, 1) through (1, 4). In general, the sub-pixel detector arrays 1610 may have any number of rows and columns and is not limited to the number and arrangement shown in FIG. 16B. Each sub-pixel detector in the sub-pixel detector arrays 1610 may be connected to a common cathode 1606 that is connected to a voltage source 1608 for providing a voltage bias to the sub-pixel detector array 1610. The common cathodes 1606 for each sub-pixel detector array 1610 may extend slightly under each collimator 1604. Each sub-pixel detector may be connected to a separate anode 1612. Each of the anodes 1612 may be connected to separate ASIC channels that may read the charge from a plurality of sub-pixel detectors in the sub-pixel detector array when a photon strikes one or more of the sub-pixel detectors in the array, such as illustrated in FIGS. 17A-5B. The cross-sectional view of the radiation detector array 1600 may include additional components not illustrated in FIG. 16B.

Figure 17B:
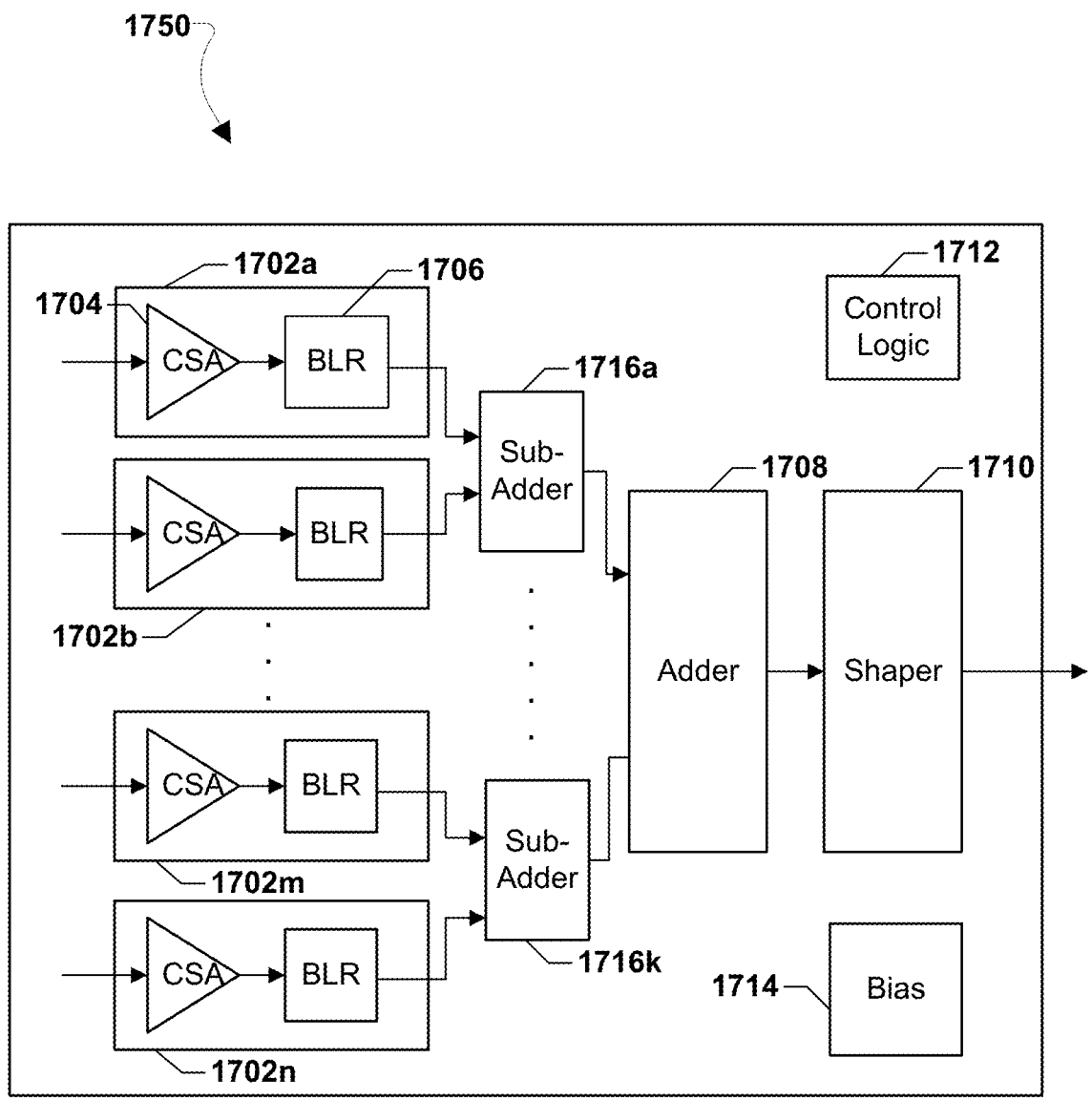

FIGS. 17A-17B are circuit block diagrams of components in a pixel detector circuit 1700 of a radiation detector array according to various embodiments. The pixel detector circuits 1700, 1750 may be connected to the pixelated radiation detector 1600 illustrated in FIGS. 16A and 16B, so that the circuit takes as input the signals from each sub-pixel detector 1610 in each pixel 1602.

Referring to FIG. 17A, the pixel detector circuit 1700 may include a number of ASIC channels 1702a-1702n that take as input the signal from each respective anode of each sub-pixel detector in the sub-pixel detector array. For example, if each pixel is made up of an array of N×M sub-pixel detectors, there would be N×M ASIC channels 1702a-1702n. Each ASIC channel 1702a-1702n may include a charge-sensitive amplifier (CSA) 1704 that amplifies the charge signal from an associated sub-pixel detector.

Each ASIC channel 1702a-1702n may also include an optional base line restoration (BLR) circuit 1706 that may be used to preserve the reference (or baseline) level for the signal.

When a photon strikes at least one sub-pixel detector with a charge or energy that exceeds a threshold, the pixel detector circuit 1700 may trigger all the ASIC channels 1702a-1702n to read the charge from all the sub-pixel detectors in each. The signals from each ASIC channel 1702a-1702n are then added together by adder 1708. The adder 1708 may automatically sum the signals from each ASIC channel 1702a-1702n (and thus each sub-pixel detector) when any photon is detected. In this way, if the photon strikes more than one sub-pixel detector, the charges detected by each of the struck sub-pixel detectors may be automatically added so that the energy of the photon may be determined.

As noted herein, reducing the area of detectors in the sub-pixel detector array will increase the fraction of photon detection events that involve charge sharing between sub-pixel detectors compared to an array of relatively large pixel detectors. Summing the energies measured in all sub-pixel detectors within a pixel detector partially compensates for charge sharing. The extra charge loss within each pixel detector due to absorption in the inter-sub-pixel gaps may be addressed through a sub-pixel charge sharing correction according to some embodiments.

After the adder 1708 sums the signals from each sub-pixel detector, a shaper 1710 may be used to shape the signal. Alternatively, each ASIC channel 1702a-1702n may include a shaper that is located after the BLR circuit 1706 and filters the signal. The signal may then be outputted to other electronic components such as a field programmable gate array (FPGA) for further signal processing and read out operations. The pixel detector circuit 1700 may include other components, such as a control logic circuit 1712, a voltage bias 1714 for providing power to the pixel detector circuit 1700, a local memory storage for buffering data, an input/output interface, and other components not illustrated in FIG. 17A. The pixel detector circuit 1700 may be manufactured using sub-micron complementary metal oxide semiconductor (CMOS) process nodes such as 45 nm or 165 nm. In addition, the manufacturing process may use a lower power supply voltage which may counteract increases in power dissipation due to higher ASIC channel counts.

An alternate configuration of the pixel detector circuit 1750 is shown in FIG. 17B, which uses multiple summing stages instead of a single adder such as the adder 1708. The summing stages may be implemented in such a way that some groups of sub-pixel detectors are summed first by sub-adders 1716, which are then summed together by the adder 1708. For example, in the first summing stage the ASIC channels 1702a and 1702b may be summed together by a sub-adder 1716a, while the ASIC channels 1702m and 1702n may be summed together by a sub-adder 1716k. The various sub-adders 1716a-1716k may be routed to the adder 1708 in the second summing stage. The ASIC channels 1702a-1702n may be divided into any number of sub-groups, each sub-group being added together by the sub-adders 1716a-k.

In some embodiments, the sub-adders 1716 may be configured so that only sub-pixel detectors 1610 within a given pixel 1602 are added together. As such, simultaneous detections by sub-pixel detectors in two different pixels will not be treated as charge-sharing events. Including the collimators 1604 around each pixel may eliminate or minimize inter-pixel charge sharing events, enabling various embodiments to correct solely for charge-sharing effects within each pixel without introducing significant errors.

In some embodiments, fast control digital logic may be used to control which sub-group of sub-pixel detectors 1610 are summed together. For example, if a photon is detected only one sub-group of sub-pixel detectors, the charge summing may only occur within that sub-group rather than for all the sub-pixel detectors in the sub-pixel detector array. This may avoid adding noise signals from the other non-affected sub-pixel detectors in other sub-groups. For example, if a photon is detected by a sub-pixel detector connected to the ASIC channel 1702b, only the signals from the ASIC channels 1702a and 1702b may be summed by the sub-adder 1716a and the adder 1708. The remaining ASIC channels 1702 may not be summed by the remaining sub-adders 1716 so that the adder 1708 only receives a non-zero signal from the sub-adder 1716a. There may be more than two summing stages in the pixel detector circuit 1750 as illustrated in FIG. 17B. The number of summing stages that may be implemented in the pixel detector circuit 1750 may involve a trade-off between the complexity of the digital control scheme of the pixel detector circuit 1750 and its associated power dissipation during operation, and the ability to eliminate noise from non-active sub-pixel detectors.

There are two significant consequences of forming pixels from arrays of sub-pixel detectors: increased charge-sharing effects and requiring more ASIC channels to monitor/process all of the added detector elements.

Various embodiments address the increase in charge-sharing that occurs by reducing the area of each detector element by using the compensation techniques described above and as more fully explained below. Various embodiments compensate for this effect by basically adding two splitting charges back, and applying a charge-sharing loss correction to compensate for the loss due to the inter-sub-pixel gaps.

Scaling down pixel detector sizes into sub-pixel detectors, although straightforward in principle, faces numerous challenges. In order to retain the same ratio between active pixel detector area and dead inter-pixel detector space, the inter-pixel detector gap between sub-pixel detectors may be scaled down as well. Reducing the gap dimension can lead to decreased resistance between sub-pixel detectors, which may increase sub-pixel-to-sub-pixel crosstalk. Also, a larger number of pixels requires an increased number of ASIC electronic channels for signal processing, leading to potentially higher total dissipated power. Higher dissipated power may in turn lead to increased temperatures near the detectors, which without an engineered cooling solution could result in increased detector leakage currents and degradation in the energy resolution of the measured radiation spectra.

CZT detectors suffer from a well-known problem of incomplete charge collection due to charge trapping effects. Changing the pixel detector size to form the sub-pixel array for a given CZT depth changes the detector geometry and the corresponding small pixel detector effect. However, reducing the dimensions of pixel detectors to form sub-pixel arrays offers better charge collection efficiency due to what is referred to herein as a small-pixel detector effect.

Describing the small pixel detector effect quantitatively involves calculating the distribution of the so-called weighting potential. Three-dimensional (3D) numerical simulations using Ramo-Shockley's formula for small-pixel detector devices has been used to determine numerical weighting potential distributions calculated for the pixelated detectors with various anode size-to-detector thickness ratios. The smaller the anode size the more the weighting distribution is "bent" and departs from a linear behavior observed for the planar detectors. The following analytical approximation for the weighting potential distribution captures this property in simple manner:

$$V(x) = V \cdot (x/d)^n \quad (6)$$

where x is the distance from the cathode, d is the detector thickness and n is a numerically (or experimentally) fitted parameter. Using 3D weighting potential results, a good fit can be obtained using n equal to twice d/a ratio, where a is the anode size (assuming square shaped anode pixels). For a typical detector used in commercial products d is 5 mm and a is 2 mm, so the fitted value of n is 5.

The smaller the pixel detector size a (and thus the larger n), the more the weighting potential distribution is confined to the anode, which should improve the energy resolution (ER). However, this would be only true if no trapping effects were present.

With some amount of trapping effects present, making the pixel detector smaller may not necessarily provide better ER. Thus, there may be an optimum sub-pixel detector size for a given set of material parameters. Such an optimum pixel detector size for the first set of detectors may be about 0.5 mm to obtain CCE as close to 100% as practical, while an optimum pixel detector size might be larger in the 1 mm range for the second set. Thus, the optimum pixel detector size, or optimum pixel detector scaling when the original pixel detector is large has a certain optimum point.

Turning to the effects of reducing pixel detector dimensions on dark energy, consider a pixelated detector array of k by k pixels each being a square of side a and an inter-pixel detector gap g. In order to obtain better spatial resolution, both a and g may be scaled by the same scaling factor S (S>1) so that after scaling the pixel detector size is a/S and the inter-pixel detector gap is g/S. The detector thickness d need not be scaled as it depends on the given photon energy range of interest and the desired detector sensitivity.

Under these assumptions the inter-pixel detector resistance is, to a first order, independent of the scaling factor S and may be indicated by the following formula:

$$R_{inter} = R_s(g/S)/(a/S) = R_s g/a \quad (7)$$

where $R_s$ is the CZT surface sheet resistance assumed to be constant. Equation (7) assumes one-dimensional current flow, an assumption that leads to an error smaller than 2% for typical pixel detector design where the a/g aspect ratio is 5 or higher.

In a similar fashion to (2) an inter-pixel detector capacitance Cutter can be modeled as:

$$C_{inter} = \varepsilon(a/S)*h/(g/S) = \varepsilon a h/g \quad (8)$$

where ε is the dielectric permittivity of the encapsulant or other medium present in the space between pixels (could be air) and h is the CZT metallization height assumed to be constant as it is dependent on CZT pixel detector attachment technology. In equation 8, $C_{inter}$ is defined only as an external stray capacitance with the dielectric of air or any other underfill or encapsulant. Using this assumption, there is no change with scaling of subpixel detectors. However, a better model of $C_{inter}$ (ignoring the fringe capacitance at the edge of pixel and cap from very close to the surface between two pixels) considers two $C_{detec}$ connected also to the cathode plane from each pixel. In such scenarios, $C_{inter}$ will be a more complex function of scaling. Such an extension of equation 8 is easy to do but details on this extension are not provided here for simplicity.

Scaling the pixel detector size down to sub-pixel detectors changes detector leakage currents observed by each individual detector. However, the aggregate dark current does not change. Instead there are more pixel detectors with less dark current per sub-pixel detector for the same total product of the two. The vertical bulk component of the leakage current scales down with an $S^2$ factor as anticipated, assuming that the bulk resistivity $\rho$ does not scale:

$$I_{bulk} = V_{HV}*(a/S)^2/(\rho*d) \quad (9)$$

where $V_{HV}$ is the high-voltage bias between anode and cathode. However, the surface lateral component of the leakage current scales only with S if the detector sides are assumed to be characterized by the same surface resistance Rs:

$$I_{surf} = V_{HV}*(a/S)/(R_s*d) \quad (10)$$

Different scaling properties of the bulk and surface leakage make the surface component more important with scaling to smaller sized detector elements. The surface leakage is only relevant for pixels on the outer edge of the detector, and it can be dealt with using proper guard-ring design. For these reasons only the bulk leakage given by equation (9) need be addressed in correction factors.

Scaling the pixel detectors to smaller sizes reduces the detector capacitance $C_{det}$ of the sub-pixel detectors. This may be calculated as:

$$C_{det} = \varepsilon(a/S)^2/d \quad (11)$$

Equation (11) above represents a parallel plate model, which for small pixel detector sizes becomes increasingly inaccurate. Nevertheless, the $1/S^2$ scaling represented by equation (11) is a good first-order approximation.

Table 1 below summarizes the basic scaling properties presented by equations (7)-(11). The starting point is a design used in practical systems which is representative for today's CZT detector technology in which: a=2 mm, g=0.46 mm, d=5 mm, h=0.1 mm, $\rho=10^{10}$ $\Omega\cdot$cm and $R_s=10^{11}\Omega$. Table 1 shows that reducing the pixel detector size from 2 mm (S=1) to 0.25 mm (S=8) for sub-pixel detectors results in the basic properties of the CZT detector scale changing favorably (bulk leakage, detector capacitance), not changing significantly (inter-pixel detector capacitance and resistance).

TABLE 1

Scaling performance of basic properties of CZT detectors

| | S = 1, a = 2 mm | S = 2, a = 1 mm | S = 4, a = 0.5 mm | S = 8, a = 0.25 mm |
|---|---|---|---|---|
| $R_{inter}$ (G$\Omega$) | 23.0 | 23.0 | 23.0 | 23.0 |
| $C_{inter}$ (pF) | 0.042 | 0.042 | 0.042 | 0.042 |
| $I_{bulk}$ (nA/pixel) | 0.423 | 0.106 | 0.026 | 0.007 |
| $I_{surf}$ (nA/pixel) | 0.920 | 0.460 | 0.230 | 0.115 |
| $I_{bulk}/I_{surf}$ | 0.460 | 0.230 | 0.115 | 0.058 |
| $C_{det}$ (pF) | 0.078 | 0.019 | 0.005 | 0.001 |

Table 1 reveals that a significant reduction in pixel detector size is possible, thus enabling configuring each pixel as an array of sub-pixel detectors as described herein. For example, sub-pixel detector arrays may be implementing using scaling factors of S=2 (i.e., a 2×2 sub-pixel detector array) and S=3 (i.e., a 3×3 sub-pixel detector array). Deeper scaling (S>3) may be implemented in some embodiments with implementation of sub-pixel charge-sharing reconstruction to compensate for charge loss effects that increase with smaller detector sizes.

Turning now to considerations for the circuitry coupled to the sub-pixel detectors, which may be implemented in an ASIC. If the power per channel is P, then with scaling the power per channel will become P*$S^2$ if exactly the same ASIC technology and design is used. Also, the size of the ASIC chip will increase by a factor of $S^2$. However, the readout ASICs designed for pixel detectors with sizes similar to the sub-pixel detectors of various embodiments typically dissipate much less power, on the order of a few uW per channel, compared to ASICs designed for large pixel detectors. This is because the input CSA amplifier that drives the sub-pixel detectors can be made much smaller than is required for large pixel detectors. As a result, the total power dissipated by an ASIC chip designed for pixelated detector arrays with sub-pixel detectors is expected to be about the same or slightly larger than the ASIC chip designed for conventional pixelated detector arrays.

To give some examples, the ASIC used in a current conventional pixelated detector array dissipates 1.2 mW/channel but has only 128 channels for a total dissipated power of 150 mW, with two such ASICs used 256-pixel detectors. A contemplated design of an ASIC that will have 1024 channels to support pixels each made up of a 2×2 array (i.e., S=2) of sub-pixel detectors is expected to have a power dissipation of 50 uW per channel, and thus have a total dissipated power of 510 mW, with only one ASIC needed for 4×256 sub-pixel detectors. Thus, the ASIC required to support an embodiment 256-pixel detector array in which each pixel is made up of a 2×2 array of sub-pixel detectors is expected dissipate 1.7 times the amount of power of the ASICs associated with a conventional 256-pixel detector array.

Figure 18A:
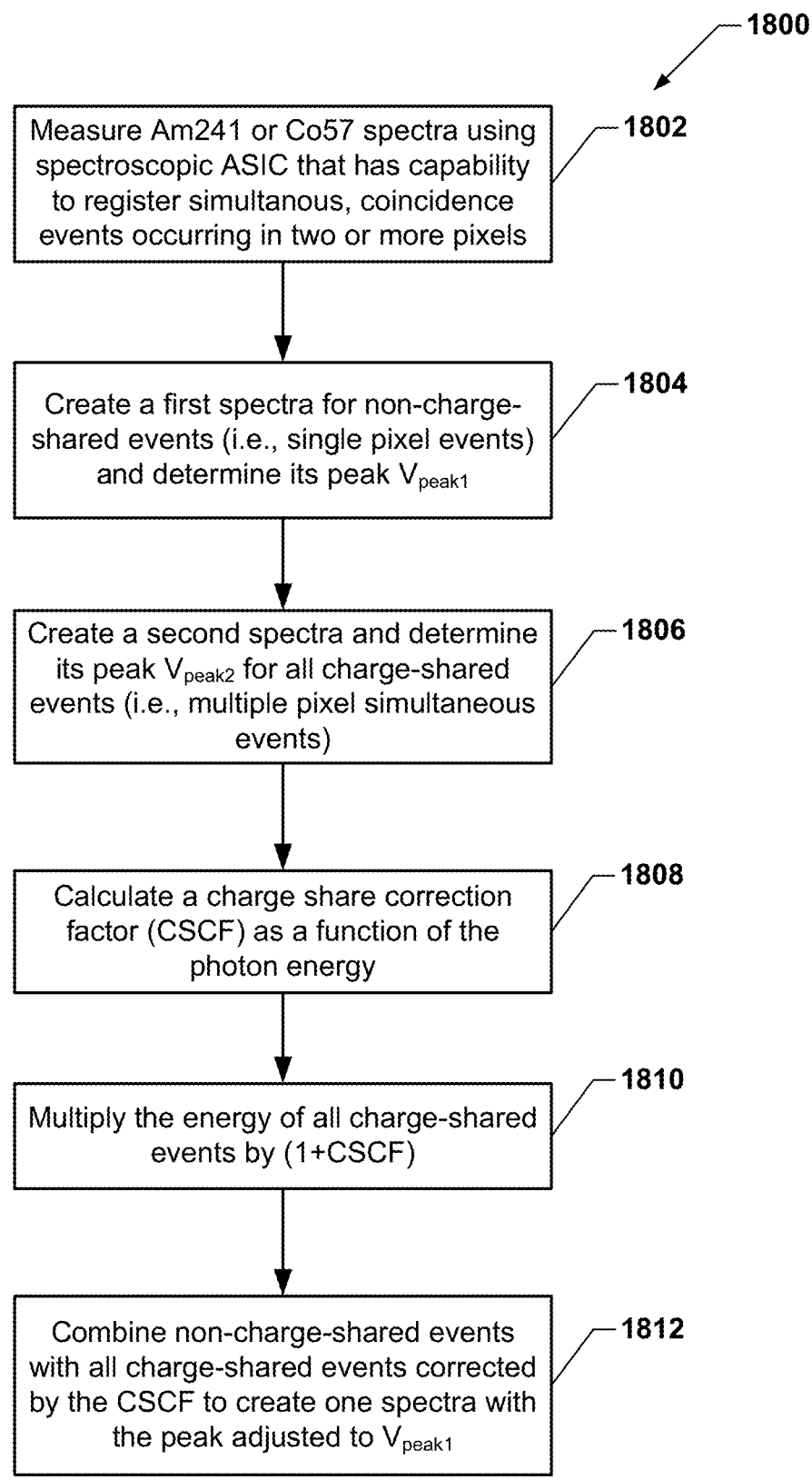
FIG. 18A is a process flow diagram of a method for determining detection measurements for pixels within the radiation detector array by compensating for charge sharing effects among subpixel detectors and combining measurements from subpixel detectors within a pixel.

FIG. 18A illustrates a method 1800 for calibrating sub-pixel radiation detectors and adjusting the output of such detectors to account for charge sharing effects among sub-pixel detectors according to various embodiments. The method 1800 may be implemented by a processor of a computing device (e.g., the computer 112 of FIG. 1 or the computing device 1900 of FIG. 19) and/or within the detector processing circuitry (e.g., processing circuits 1700 and 1750).

In step 1802, the processor may measure the energy spectra of radiation received on a sub-pixel radiation detector from an Am241 or Co57 source using a spectroscopic ASIC interface circuit that has capability to register simultaneous, coincidence events on multiple sub-pixel detectors. Such measurements may involve recording the net charge or voltage that is accumulated on the anode of each sub-pixel detector with each detection event.

In step 1804, the processor may determine a first energy spectra for single sub-pixel detection events based on energy measurements of detection events occurring in single sub-pixel detectors. As part of this step the ASIC or the processor receiving an output from the ASIC may record the peak voltage value $V_{SPpeak1}$ measured with each single sub-pixel detection event. In some embodiments, the processor may determine the first spectra for the non-charge-shared events (i.e., single sub-pixel detection events) indicated by the spectroscopic ASIC device, and use the results to determine a peak value $V_{SPpeak1}$ using normal analysis algorithms.

In step 1806, the processor may determine a second energy spectra for charge sharing detection events, which are detection events occurring simultaneously in two or more sub-pixel detectors ("sub-pixel simultaneous detection events"). As described above, the ASIC may automatically sum the charges accumulated on all sub-pixel detectors within a given pixel and allocate the summed voltages to that pixel. In addition to automatic summing across all sub-pixel detectors in a given pixel, the ASIC may recognize when charge is accumulating simultaneously on the anodes in two or more sub-pixel detectors within a given pixel (i.e., a sub-pixel simultaneous detection event). The ASIC may annotate or indicate with the output for that pixel that the detection event was a sub-pixel simultaneous detection event. In some embodiments the processor receiving such data from the ASIC may process the indicated sub-pixel simultaneous detection event measurements separate from outputs in which charge sharing did not occur (i.e., single sub-pixel detector detection events). In doing so, the processor may determine the peak value $_{SPpeak2}$ measured in the sub-pixel simultaneous detection events. In some embodiments the processor may determine the second spectra for all sub-pixel simultaneous detection events identified by the spectroscopic ASIC device, and use the results to determine a peak value $V_{SPpeak2}$.

In step 1808, the processor may determine a sub-pixel charge sharing correction factor (SPCSCF) as a function of the photon energy in two or more sub-pixel detectors within a given pixel using data obtained from calibration data, such as illustrated in FIGS. 13B and 13C. As illustrated in FIG. 12D, inter-sub-pixel charge loss will be greatest when the charges measured by the adjoining sub-pixel detectors is equal or nearly equal, and decreases asymptotically as the difference in measured energy between the two sub-pixel detectors increases. Thus, the photon energies measured in adjacent sub-pixel detectors in a two-sub-pixel charge-sharing scenario will be divided between the two sub-pixel detectors minus the charge loss. When the energies are not equally divided between the two sub-pixel detectors, the inter-sub-pixel gap charge loss will be smaller. The closer the measured energy in one sub-pixel approaches that of the absorbed photon, the less the energy that will be consumed by the inter-sub-pixel charge loss. By collecting data on measured energies in sub-pixel detectors within a given pixel from inter-sub-pixel gap events during a calibration exposure, a charge sharing correction factor can be determined that accounts for observed charge sharing losses.

In step 1810, the processor may adjust energy measurements of pixels for sub-pixel simultaneous detection events by a charge sharing correction factor. In particular the processor may multiply the energy of all detected sub-pixel simultaneous detection events (the second energy spectra) by (1+SPCSCF), effectively shifting the energy of these events to higher energies by the correction factor. For example, the sub-pixel charge sharing correction factor may shift energies of sub-pixel simultaneous detection events by 10-15%.

In step 1812, the processor may determine a corrected energy spectrum by adding the adjusted energy measurements of sub-pixel simultaneous detection events to the first energy spectra of detection events occurring in single sub-pixel detectors. Thus, the processor may combine the non-charge-shared detection events with all sub-pixel simultaneous detection events corrected by the sub-pixel charge sharing correction factor to create one spectrum for each pixel with the peak adjusted to $V_{peak1}$.

The combined photon energy spectra determined in step 1812 will offer a more accurate spectra with efficiency than achieved using conventional correction methods.

In various embodiments, the operations in steps 1802-1808 may be performed during a calibration procedure, such as during manufacture of the radiation detector and/or during service of a gamma camera using a gamma source with a known gamma ray energy and flux, while the operations in steps 1810 and 1812 are performed during imaging operations of the gamma camera.

Figure 18B:
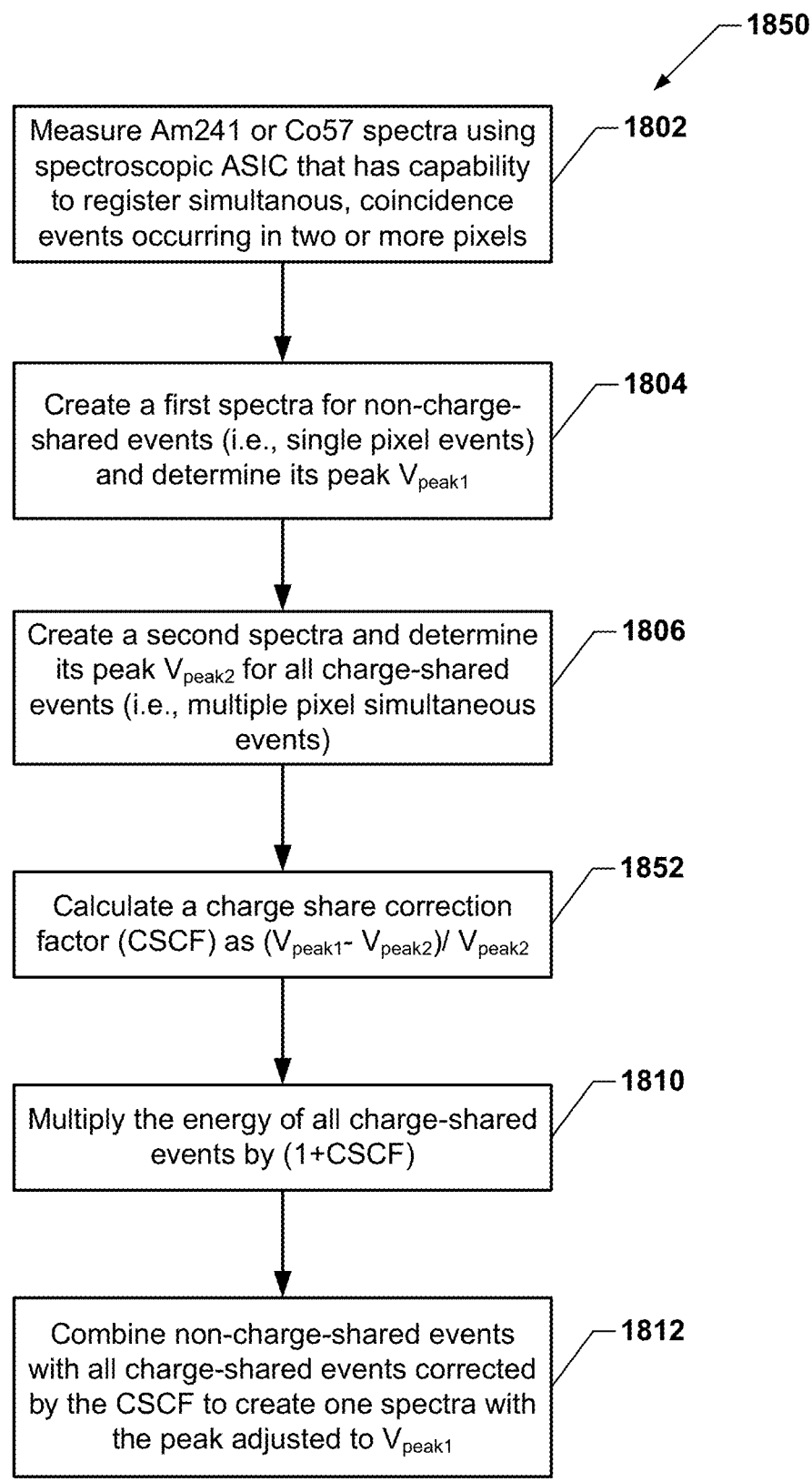
FIG. 18B is a process flow diagram of a method for calibrating a radiation detector array made up of pixels formed from an array of sub-pixel detectors.

FIG. 18B illustrates another method 1850 for calibrating pixel radiation detectors in which each pixel is made up of an array of sub-pixel detectors, and adjusting the output of such detectors to account for charge sharing effects among sub-pixel detectors according to another embodiment. The method 1850 may be implemented by a processor of a computing device (e.g., the computer 112 of FIG. 1 or the computing device 1900 of FIG. 19).

In the method 1850 the steps 1802 to 1806 may be performed as described above for the method 1800.

In step 1852, the processor may calculate the sub-pixel charge sharing correction factor (SPCSCF) using the formula (Vpeak1−Vpeak2)/Vpeak2. Typically, this will be about 10-15%, but may be larger for detectors with a large inter-sub-pixel gap with respect to the sub-pixel pitch. Depending upon the inter-sub-pixel gap and the quality of the surface passivation, this number can vary from 0 to 50%.

In various embodiments, the operations in steps 1802-1806 and 1852 may be performed during a calibration procedure, such as during manufacture of the radiation detector and/or during service of a gamma camera using a gamma source with a known gamma ray energy and flux. The operations in steps 1810 and 1812 are performed as described above for the method 1800 during imaging operations of the gamma camera.

The calibration operations illustrated in the embodiment methods 1800 and 1850 may be performed after manufacturing on a per detector basis in order to accommodate differences in inter-sub-pixel gap charge loss resulting from differences in surface passivation that may occur from fabrication lot to fabrication lot, from detector to detector within a fabrication lot. Alternatively, the calibration operations illustrated in the embodiment methods 1800 and 1850 may be performed after detectors have been assembled into a gamma camera, such as part of initial and/or periodic calibrating the camera and imaging system. The calibration operations illustrated in the embodiment methods 1800 and 1850 may be repeated across a range of temperatures at which the detector is expected to operate. Further, the calibration factors determined in steps 1808 and 1852 may be determined for each inter-sub-pixel gap to account for the differences in surface passivation across each detector.

When the calibration operations in steps 1808 and 1852 are performed during or after fabrication, the correction factor(s) determined during calibration testing may be stored in FLASH memory of the detector module as part of steps 1808 and 1852, so that the correction factors are available for use in steps 1810 during operation of the detector. When the calibration operations in steps 1808 and 1852 are performed after assembly of the imaging system (e.g., a SPECT system), the correction factor(s) determined during calibration testing may be stored in memory of an analysis unit (e.g., 110) as part of steps 1808 and 1852, so that the correction factors are available for use in steps 1810 during operation of the imaging system.

Figure 19:
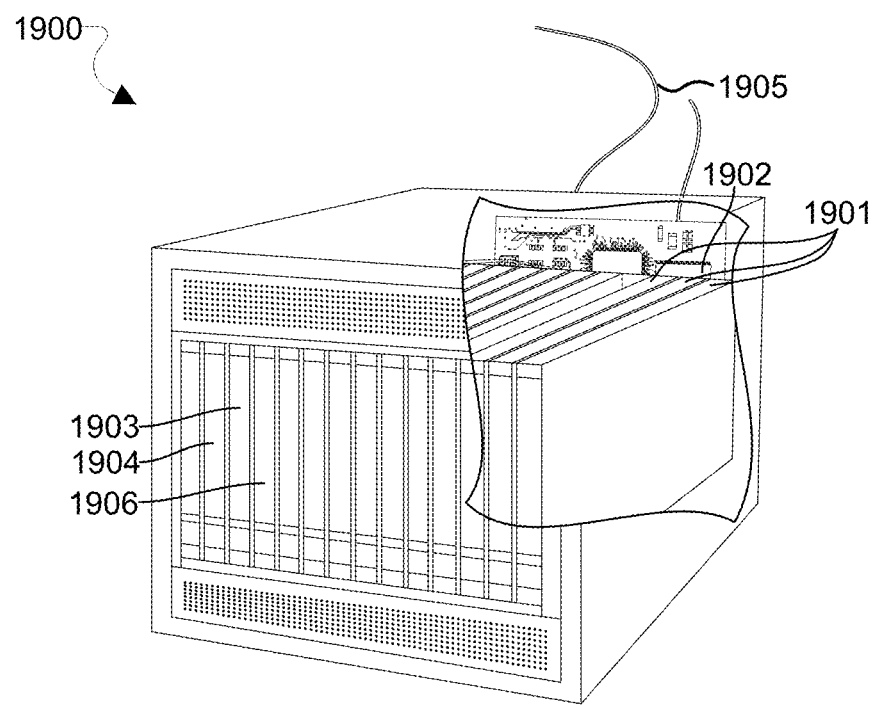
FIG. 19 is a component block diagram illustrating an example server suitable for use with the various embodiments.

The various embodiments (including, but not limited to, embodiments described above with reference to FIGS. 14A, 14B, 18A and 18B) may also be implemented in computing systems, such as any of a variety of commercially available servers. An example server 1900 is illustrated in FIG. 19. Such a server 1900 typically includes one or more multicore processor assemblies 1901 coupled to volatile memory 1902 and a large capacity nonvolatile memory, such as a disk drive 1904. As illustrated in FIG. 19, multicore processor assemblies 1901 may be added to the server 1900 by inserting them into the racks of the assembly. The server 1900 may also include a floppy disc drive, compact disc (CD) or digital versatile disc (DVD) disc drive 1906 coupled to the processor 1901. The server 1900 may also include network access ports 1903 coupled to the multicore processor assemblies 1901 for establishing network interface connections with a network 1905, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The present embodiments may be implemented in systems used for medical imaging, Single Photon Emission Computed Tomography (SPECT) for medical applications, and for non-medical imaging applications, such as in baggage security scanning and industrial inspection applications.

Charge sharing effects in sub-pixel detectors may cause efficiency variations and spectral degradation. In a photon counting system, like a SPECT system, such events can be missed or double-counted, depending on the detector settings. The effect depends on the sub-pixel detector geometry, detector thickness, electric field and the size of the charge cloud spreads as it drifts towards the anodes. In spectroscopic systems, such as SPECT, charge-sharing events are even more harmful as they disturb readings of the gamma-ray photons. Charge sharing, if left uncorrected, may lead to lower detector efficiency, increased spectrum tail and decreased energy resolution.

The various embodiments overcome these issues caused by charge sharing in sub-pixel detectors by providing a method that properly treats the charge-sharing phenomena by precise calibration of CZT sub-pixel detectors. The methods of various embodiments apply in particular to spectroscopic applications, and for systems that use small-pixel detectors in SPECT. In particular, various embodiments include measuring radiation energy spectra by an array of pixels each composed of an array of sub-pixel detectors capable of registering simultaneous, coincident detection events occurring in two or more sub-pixel detectors, adjusting energy measurements of detection events occurring simultaneously in two or more sub-pixel detectors by a sub-pixel charge sharing correction factor, and determining a corrected energy spectra by adding the adjusted energy measurements of detection events occurring simultaneously in two or more sub-pixel detectors to energy spectra of detection events occurring in single sub-pixel detectors. In some embodiments, determining the sub-pixel charge sharing correction factor may include determining a first energy spectra for detection events occurring in single sub-pixel detectors and determining its peak value $V_{SPpeak1}$, determining a second energy spectra for detection events occurring simultaneously in two or more sub-pixel detectors and determining its peak value $V_{SPpeak2}$, and calculating the charge sharing correction factor as $(V_{SPpeak1}-V_{SPpeak2})/V_{SPpeak2}$. In some embodiments, adjusting energy measurements of detection events occurring simultaneously in two or more sub-pixel detectors by a charge sharing correction factor may include multiplying measured energies of detection events occurring simultaneously in two or more sub-pixel detectors by a factor of one plus the sub-pixel charge sharing correction factor.

While the disclosure has been described in terms of specific embodiments, it is evident in view of the foregoing description that numerous alternatives, modifications and variations will be apparent to those skilled in the art. Each of the embodiments described herein may be implemented individually or in combination with any other embodiment unless expressly stated otherwise or clearly incompatible. Accordingly, the disclosure is intended to encompass all such alternatives, modifications and variations which fall within the scope and spirit of the disclosure and the following claims.

What is claimed is:

1. A method for correcting spectra measured by an imaging radiation detector comprised of an array of pixels each of which is comprised of an array of sub-pixel detectors to account for charge sharing effects, comprising:

measuring radiation energy spectra by the imaging radiation detector using processing circuitry capable of registering simultaneous, coincident detection events occurring in two or more sub-pixel detectors within any pixel;

summing energy measurements of detection events occurring simultaneously in two or more sub-pixel detectors within a pixel which comprise sub-pixel simultaneous detection events to obtain a first energy measurement of multi-subpixel detection events;

adjusting the first energy measurements of sub-pixel simultaneous detection events by a sub-pixel charge sharing correction factor to account for inter-sub-pixel charge loss effects; and determining a corrected gamma photon energy spectrum by adding the adjusted energy measurements of sub-pixel simultaneous detection events to gamma photon energy measurements of detection events occurring in single sub-pixel detectors which comprise single-sub-pixel detection events.

2. The method of claim 1, further comprising determining the sub-pixel charge sharing correction factor by:

exposing the imaging radiation detector to radiation from a source of gamma photons of a known energy or energy spectrum;

estimating gamma photon energies for sub-pixel simultaneous detection events by summing energy measurements by the two or more sub-pixel pixel detectors; and determining the sub-pixel charge sharing correction factor based upon the known energy or energy spectrum of gamma photons from the source and the estimated gamma photon energies from sub-pixel simultaneous detection events to account for the inter-sub-pixel charge loss effects.

3. The method of claim 2, wherein adjusting the energy measurements of sub-pixel simultaneous detection events by a sub-pixel charge sharing correction factor comprises multiplying measured energies of sub-pixel simultaneous detection events by a factor of one plus the sub-pixel charge sharing correction factor.

4. The method of claim 2, wherein determining the sub-pixel charge sharing correction factor is performed for each pixel detector individually to determine a sub-pixel charge sharing correction factor for each pixel.

5. The method of claim 4, wherein determining the corrected gamma photon energy spectrum is performed for each pixel by:
summing energy measurements of sub-pixel simultaneous detection events within each pixel detector to obtain a first energy measurement of multi-subpixel detection events in each pixel;
adjusting the first energy measurements of sub-pixel simultaneous detection events in each pixel detector by the sub-pixel charge sharing correction factor determined for each pixel detector; and
determining a corrected gamma photon energy spectrum for each pixel detector by adding the adjusted energy measurements of sub-pixel simultaneous detection events to energy measurements of single-sub-pixel detection events in each pixel detector.

6. The method of claim 1, further comprising determining the sub-pixel charge sharing correction factor by:
exposing the imaging radiation detector to radiation from a source of gamma photons of a known energy or energy spectrum;
determining a first energy spectra for detection events occurring in single sub-pixel detectors and determining its peak value $V_{SPpeak1}$;
determining a second energy spectra for sub-pixel simultaneous detection events and determining its peak value $V_{SPpeak2}$; and
calculating the sub-pixel charge sharing correction factor as $(V_{SPpeak1}-V_{SPpeak2})/V_{SPpeak2}$.

7. The method of claim 6, wherein adjusting the energy measurements of sub-pixel simultaneous detection events by a charge sharing correction factor comprises multiplying measured energies of sub-pixel simultaneous detection events by a factor of one plus the sub-pixel charge sharing correction factor.

8. A method of calibrating a pixel radiation detector comprising an array of pixels each comprising an array of sub-pixel detectors to account for inter-sub-pixel charge sharing effects, comprising:
exposing the imaging radiation detector to radiation from a source of gamma photons of a known energy or energy spectrum;
measuring gamma photon energies detected by the pixel radiation detector using electronics capable of registering simultaneous, coincident detection events occurring in two or more sub-pixel detectors within a pixel;
determining energies of gamma photons detected in sub-pixel detectors within a pixel for detection events occurring simultaneously in two or more sub-pixel detectors within a pixel which comprise sub-pixel simultaneous detection events; and
determining a sub-pixel charge sharing correction factor based upon the radiation source known gamma photon energy and determined energies of gamma photons detected in sub-pixel detectors within a pixel in sub-pixel simultaneous detection events to account for the inter-sub-pixel charge loss effects.

9. The method of claim 8, wherein determining a sub-pixel charge sharing correction factor based upon the radiation source known gamma photon energy and determined energies of gamma photons detected in adjoining pixels in sub-pixel simultaneous detection events accounts for inter-sub-pixel gap charge loss as a function of a difference between energies measured in sub-pixel detectors.

10. The method of claim 8, wherein determining a sub-pixel charge sharing correction factor based upon the radiation source known gamma photon energy and determined energies of gamma photons detected in adjoining pixels in sub-pixel simultaneous detection events comprises:
determining a first energy spectra for detection events occurring in single pixels and determining its peak value $V_{SPpeak1}$;
determining a second energy spectra for sub-pixel simultaneous detection events occurring and determining its peak value $V_{SPpeak2}$; and
calculating the charge sharing correction factor as $(V_{SPpeak1}-V_{SPpeak2})/V_{SPpeak2}$.

11. The method of claim 8, determining a sub-pixel charge sharing correction factor based upon the radiation source known gamma photon energy and determined energies of gamma photons detected in sub-pixel detectors in sub-pixel simultaneous detection events is performed for each pixel detector individually to determine a sub-pixel charge sharing correction factor for each pixel.

12. The method of claim 11, where in the method is performed as part of manufacturing the pixel radiation detector.

13. The method of claim 12, further comprising storing the sub-pixel charge sharing correction factors in memory associated with the pixel radiation detector.

14. An imaging radiation detector, comprising:
an array of pixels each comprising an array of sub-pixel detectors; and
detector processing circuitry coupled to each sub-pixel detector, the detector processing circuitry capable of registering simultaneous, coincident detection events occurring in two or more sub-pixel detectors within any pixel and configured to:
sum energy measurements of detection events occurring simultaneously in two or more sub-pixel detectors within a pixel which comprise sub-pixel simultaneous detection events to obtain a first energy measurement of multi-subpixel detection events;
adjust the first energy measurements of sub-pixel simultaneous detection events by a sub-pixel charge sharing correction factor to account for inter-sub-pixel charge loss effects; and
determine a corrected gamma photon energy spectrum by adding the adjusted energy measurements of sub-pixel simultaneous detection events to gamma photon energy measurements of detection events occurring in single sub-pixel detectors.

15. An imaging radiation detector, comprising:
an array of pixels each comprising an array of sub-pixel detectors;
means for summing energy measurements of detection events occurring simultaneously in two or more sub-pixel detectors within a pixel which comprise sub-pixel simultaneous detection events to obtain a first energy measurement of multi-subpixel detection events;
means for adjusting the first energy measurements of sub-pixel simultaneous detection events by a sub-pixel charge sharing correction factor to account for inter-sub-pixel charge loss effects; and
means for determining a corrected gamma photon energy spectrum by adding the adjusted energy measurements of sub-pixel simultaneous detection events to gamma photon energy measurements of detection events occurring in single sub-pixel detectors.

* * * * *